United States Patent
Yokota et al.

[11] Patent Number: 6,135,142
[45] Date of Patent: Oct. 24, 2000

[54] CONTROL VALVE DEVICE

[75] Inventors: Hiroshi Yokota; Shingo Yokota, both of Hiroshima, Japan

[73] Assignee: Kabushiki Kaisha Yokota Seisakusho, Hiroshima-Ken, Japan

[21] Appl. No.: 09/194,324

[22] PCT Filed: Jan. 6, 1997

[86] PCT No.: PCT/JP97/00042

§ 371 Date: Nov. 24, 1998

§ 102(e) Date: Nov. 24, 1998

[87] PCT Pub. No.: WO97/45665

PCT Pub. Date: Dec. 4, 1997

[30] Foreign Application Priority Data

May 29, 1996 [JP] Japan .................................... 8-135376

[51] Int. Cl.[7] .......................................................... G05D 7/00
[52] U.S. Cl. ............................................. 137/486; 137/492
[58] Field of Search ..................................... 137/486, 492

[56] References Cited

U.S. PATENT DOCUMENTS 5,735,308  4/1998  Yokota et al. .

FOREIGN PATENT DOCUMENTS 49-57414  6/1974  Japan .
60-53291  3/1985  Japan .
B-8-6837  4/1992  Japan .

Primary Examiner—Gerald A. Michalsky
Attorney, Agent, or Firm—Ladas & Parry

[57] ABSTRACT

An automatic-control valve device has a main valve unit, and a pilot valve unit for controlling the main valve unit. The pilot valve unit has a pilot valve A which closes when pressure in a downstream passage on the downstream side of the main valve unit increases beyond a predetermined value, a pilot valve B which opens when pressure in the downstream passage increases beyond the predetermined value. The pilot valve A and the pilot valve B are connected in series by passages through a main valve driving pressure chamber in a section between an upstream passage on the upstream side of the main valve unit and the downstream passage, and cooperate to maintain the pressure in the downstream passage at the predetermined valve. A pilot valve C which closes when the pressure difference across an orifice disposed in a passage extending through the main valve unit is greater than a predetermined value is connected in series to a passage extending across the pilot valve A to limit the flow rate of a fluid in the downstream passage to a predetermined value. The respective valve elements of the pilot valve A and the pilot valve B may be held on a single valve stem. The orifice may be of a variable type. The automatic-control valve device may be provided with a valve means placed in a passage extending across the pilot valve A to open and close the passage according to the variation of a liquid level on the downstream side, and a valve means placed in a passage extending across the pilot valve A to close the passage upon the detection of an abnormal condition by an abnormal condition detecting means.

13 Claims, 10 Drawing Sheets

CONTROL VALVE DEVICE

TECHNICAL FIELD

The present invention relates to an automatic-control valve device with an automatic restriction control passage to be installed in a fluid conducting pipeline. More specifically, the present invention relates to improvements in an automatic-control lift valve disclosed in JP-B-8-6837 (hereinafter referred to as "original invention"). The present invention intends to provide a novel valve to be used as a pressure control valve convenient for conveying and distributing water, capable of saving maintenance work and of being formed without difficulty in securing a watertight joint in a closed state even in a large size or high-pressure passage, provided with a pilot valve unit omitting all elements for a fixed restriction control passage, such as needle valves and cocks, having valves capable of automatically opening for self-cleaning operation when clogged, and having functions to limit the flow of a fluid automatically so that the excessive fluid may not be supplied to downstream components as well as functions of a pressure control valve. The present invention also intends to provide a convenient automatic-control valve device capable of easily incorporating therein a liquid level control functions and emergency shutoff functions.

In this description, the term "water" is used as a general designation of fluids.

BACKGROUND ART

Generally known automatic-control valve devices prevalently used for controlling pressure or flow rate sense the pressure of a fluid flowing in the associated pipeline, and operate a main valve driving piston by a pilot valve operated by controlling the flow rate of the fluid by a fixed restriction control device, such as a needle valve. Those generally known automatic-control valve devices, however, have problems in the durability of a sealing mechanism for sealing the main valve driving piston and in the machining accuracy of the component parts of the sealing mechanism. Those generally known automatic-control valve devices need a fixed restricting device, such as a needle valve, in a passage for supplying a fluid to apply a pressure at a position on the upstream side of the main valve to the main valve driving piston to drive the main valve gradually in order that pressure pulsation due to the sudden change of the flow of the fluid can be avoided. The fixed restricting device, which has a minute, precision construction, is liable to be clogged with sand or dust.

The automatic-control lift valve of the original invention disclosed in JP-B-8-6837 solves those problems, is provided with a pilot valve unit not provided with any fixed restricting device, such as a needle valve, and free from clogging, and a main valve unit capable of being easily and simply sealed, capable of holding pressure or flow rate in a passage on the downstream side of the main valve unit at a predetermined value, and having a simple construction.

The gist of the construction of this prior art automatic-control lift valve device mentioned in the specification are itemized as follows.

(1) In the automatic-control lift valve device as an automatic constant-pressure valve as shown in FIG. 9, a main valve unit having a main valve casing 1 has a main valve element 5 and a main valve driving member 6 formed integrally with the main valve element 5, the main valve driving member 6 is fitted for sliding movement in a chamber c defined by a cylindrical wall 8 in the main valve casing 1, the main valve element 5 is disposed on the upstream side of a main valve opening b, a pilot valve A which closes to close the main valve unit when the pressure of a fluid in a downstream passage of the main valve unit rises beyond a predetermined level and a pilot valve B which closes to open the main valve unit when the pressure of the fluid in the downstream passage of the main valve unit drops below a predetermined level are connected by a passage m connected to a main valve driving pressure chamber e formed between the main valve driving member 6 and a main valve top 2, and the pilot valve A and the pilot valve B are arranged in series between an inlet passage a and an outlet passage d to make the main valve driving pressure chamber e function as an operating pressure chamber to drive the main valve unit.

(2) In the automatic-control lift valve device as an automatic constant-flow valve device as shown in FIG. 10, a variable orifice 16 is disposed at an appropriate position in the inlet or the outlet passage of the main valve unit operated by the pilot valves. Pressures in the upstream and the downstream side of the orifice are applied to the secondary pressure chambers k and the spring chambers j of the pilot valve units, respectively, to make the automatic-control lift valve device function as the automatic constant-flow valve.

Although the control valve device of the original invention achieves objects satisfactorily as a constant-pressure valve or a constant-flow valve, and is a high-performance control valve of a simple construction, problems still reside in the same control valve as considered from the viewpoint of actual working condition. When the control valve is used practically, actual working condition often requires the control valve to operate as a constant-pressure valve in a normal operating state and to operate as a constant-flow valve for limiting flow rate when fluid consumption rate in the downstream passage increases excessively. The automatic-control valve device of the original invention is incapable of dealing with such actual working condition alone. If the automatic-control valve device is formed as a constant-pressure valve and the pressure in the downstream passage drops due to excessive increase in fluid consumption rate in the downstream passage, the main valve unit of the automatic-control valve exercises the original function of a constant-pressure valve to compensate for the pressure drop, whereby the function of the automatic-control valve device to maintain the flow rate constant is spoiled. If the automatic-control valve device is formed as a constant-flow valve and the flow rate in the downstream passage decreases, the main valve unit of the automatic-control valve device exercises the original function of a constant-flow valve to compensate for a reduction in the flow rate, whereby the function of the automatic-control valve device to maintain the pressure constant is spoiled.

It has been considered that it is difficult to realize both the function of a constant-pressure valve and that of a constant-flow vale by a simple construction. Therefore, it has been usual to use a constant-pressure valve and a constant-flow valve in combination or to use a valve provided with an expensive sensors and a changeover device for changing the function of a constant-pressure valve for that of a constant-flow valve and vice versa.

Accordingly, it is an object of the present invention to provide a convenient automatic-control valve device solving the foregoing problems residing in the original invention, having all the advantages of the original invention that the fluid does not leak at all when the main valve unit is closed, not provided with any fixed restricting device, such as a needle valve, and hence free from troubles due to clogging attributable to a fixed restricting device, comprising valve units having self-cleaning capability and capable of saving maintenance work, and capable of properly exercising both the function of a constant-pressure valve and that of a constant-flow valve.

Another object of the present invention is to provide a convenient automatic-control valve device capable of easily and simply incorporating a liquid level control unction and an emergency shutoff function therein.

DISCLOSURE OF THE INVENTION

With the foregoing object in view, the present invention provides an automatic-control valve device comprising a main valve unit, and a pilot valve unit interlocked with the main valve unit to control the main valve unit according to variation of pressure of a fluid flowing through the main valve unit;

wherein the main valve unit comprises a main valve casing, a main valve element disposed in the main valve casing, and a main valve driving member disposed in the main valve casing together with the main valve element and having a pressure receiving area greater than that of the main valve element, the main valve element is disposed on the upstream side of a main valve seat so as to form a restricting passage between the main valve element and the main valve seat, the main valve driving member is disposed for sliding movement in a space defined by a cylindrical wall in the main valve casing so as to define a main valve driving pressure chamber together with the cylindrical wall, an orifice is formed in a passage extending through the main valve unit; and the pilot valve unit comprises;
a pilot valve A which is operated by a balance of forces counteracting each other and produced respectively by a pressure in a passage on a downstream side of the main valve unit and the predetermined pressure means, closes when the pressure in a passage on a downstream side of the main valve unit increases beyond a predetermined level and opens when the same decreases below the predetermined level, a pilot valve B which is operated by a balance of forces counteracting each other and produced respectively by a pressure in the passage on the downstream side of the main valve unit and the predetermined pressure means, opens when the pressure in the passage on the downstream side of the main valve unit increases beyond a predetermined level and closes when the same decreases below the predetermined level, and a pilot valve C which is operated by a balance of forces counteracting each other and produced respectively by pressure difference across the orifice and a predetermined pressure means, closes when the pressure difference across the orifice is greater than a predetermined value and opens when the same pressure difference is smaller than the predetermined value; and the pilot valve A and the pilot valve B are connected in series via passages through the main valve driving pressure chamber in a section between a passage on the upstream side of the main valve unit and a passage on the downstream side of the main valve unit, and the pilot valve C is connected in series to passages connected to the pilot valve A.

The respective valve elements of the pilot valve A and the pilot valve B may be held on a single valve stem to operate both the valve elements simultaneously by the balance of forces counteracting each other and produced respectively by pressure in the passage on the downstream side of the main valve unit and the predetermined pressures means.

The orifice may be of a variable type.

The automatic-control valve device may further comprise a valve means placed in a passage extending across the pilot valve A to open and close the passage.

The valve means may be one that is opened and closed depending upon variation of the liquid level on the downstream side, or may be one that is closed upon detection of an abnormal condition by an abnormal condition detecting means.

The predetermined pressure means may comprise an extensible double-cylinder case having an upper cylinder and a lower cylinder, capable of extending to a limit length limited by the engagement of the upper and the lower cylinder, and a compressed elastic member contained in the double-cylinder case.

The automatic-control valve device of the forgoing construction exercises the following effects.

When water flows through the automatic-control valve device, pressure in a downstream passage on the downstream side of the main valve unit varies according to the variation of fluid consumption rate in the downstream passage, the pilot valve A which closes when pressure in the downstream passage is higher than a predetermined level and the pilot valve B which opens when pressure in the downstream passage is higher than the predetermined level cooperate to maintain the pressure in the downstream passage at a predetermined level by properly controlling the pressure in the main valve driving pressure chamber to control the opening of the main valve element.

In a state where the automatic-control valve device is operating as a constant-pressure valve, the pilot valve C is open and does not interfere with the functions of the constant-pressure valve provided by the operation of the pilot valves A and B if fluid consumption rate in the downstream passage is not higher than a predetermined value.

In a state where fluid consumption rate in the downstream passage is excessively high and is about to exceeds the predetermined value, the pressure difference between pressures on the opposite sides of the orifice increase, the pilot valve C operates in a closing direction, the function of the pilot valve C takes precedence over the functions of the constant-pressure valve to maintain fluid flow rate at the predetermined value by operating the main valve element in a closing direction.

When the operation of a device on the downstream side of the automatic-control valve device is ended and as an operation for closing an end passage continues, the pressure in the downstream passage rises accordingly. Consequently, the pilot valve A closes and the pilot valve B opens to close the main valve element so that the pressure in the downstream passage is maintained at the predetermined value. The flow rate decreases as the end passage is closed and the pressure difference between the pressures on the opposite sides of the orifice decreases. Therefore, the pilot valve C is opened and does not interfere with the operations as a constant-pressure valve.

In the automatic-control valve device of this configuration according to the present invention, abnormal rise in the pressure in the downstream passage does not occur even if a sealing member combined with the main valve driving member is not very highly watertight. When clogged with sand or dust, the pilot valve A, the pilot valve B and the pilot valve C are capable of removing the sand or dust therefrom by a self-cleaning operation in which the clogged valve unit is opened automatically by a pressure variation resulting from the clogging of the same valve.

A float valve may be placed in the passage of the pilot valves to add a liquid level control function to the automatic-control valve device, and a valve means which closes when an abnormal condition detecting means detects an abnormal condition can readily by added to the automatic-control valve device to provide an emergency shutoff function additionally to the automatic-control valve device.

BEST MODE FOR CARRYING OUT THE INVENTION

The present invention will be described in its preferred embodiments shown in the accompanying drawings.

In the following description, a pilot valve A will be referred to as "A valve", a valve element included in the A valve will be referred to as "A valve element", a pilot valve B will be referred to as "B valve", a valve element included in the B valve will be referred to as "B valve element", a pilot valve C will be referred to as "C valve", a valve element included in the C valve will be referred to as "C valve element", a pressure in an upstream passage on the upstream side of a main valve unit will be referred to as "primary pressure" and a pressure in a downstream passage on the downstream side of the main valve unit will be referred to as "secondary pressure".

Figure 1:
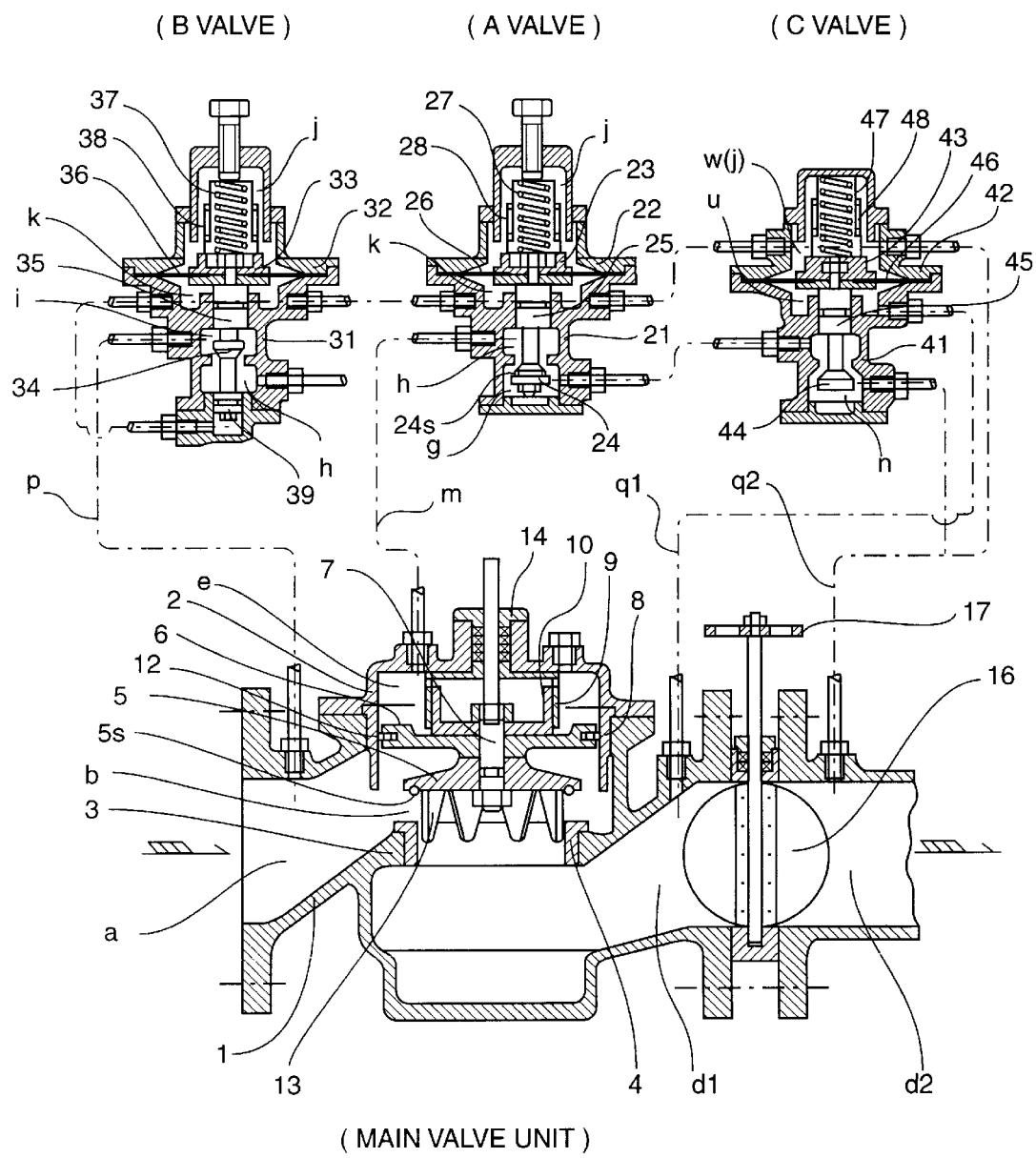
FIG. 1 is a longitudinal sectional view of an automatic-control valve device in a first embodiment of the present invention.

Referring to FIG. 1 showing an automatic-control valve device in a first embodiment of the present invention, a main valve unit has a main valve casing 1 having an inlet passage a and an outlet passage d2, a main valve top 2, and a main valve seat 4 attached to a partition wall 3 formed in the main valve casing 1. Arranged in the main valve casing 1 are a main valve element 5 disposed on the upstream side of the main valve seat 4, a main valve driving member 6 fitted for sliding movement in a space defined by a cylindrical wall 8 formed in the main valve casing 1 and provided with a sealing member 12 for making a sealed joint between the main valve driving member 6 and the cylindrical wall 8, and a main valve stem 7 holding both the main valve element 5 and the main valve driving member 6. The main valve stem 7 is supported for axial movement by the main valve seat 4 facing valve legs 13, and by a bearing 14. The main valve driving member 6, the cylindrical wall 8 and the main valve top 2 define a closed main valve driving pressure chamber e. The pressure in the driving pressure chamber e is controlled to drive the main valve element 5 for valve opening and closing operations. The pressure receiving area of the man valve driving member 6 is somewhat greater than that of the main valve element 5. A sealing member 5s attached to the main valve element 5, and a sealing member 24s attached to an A valve element 24 included in an A valve secure highly watertight sealing joints when the main valve unit is closed. Therefore, it is satisfactory if the sealing member 12 attached to the main valve driving member 6 is able to secure a low watertight sealing joint such that the leakage of the fluid through the watertight joint can be prevented.

An orifice 16 is disposed in a passage extending through the main valve unit. In this embodiment, the orifice 15 is of a variable type capable of being operated for flow control by operating a handwheel 17.

The A valve closes when the secondary pressure rises beyond a predetermined value and opens when the secondary pressure drops below the predetermined value, and the B valve opens when the secondary pressure rises beyond the predetermined value and closes when the secondary pressure drops below the predetermined value. These A and B valves are connected to the main valve driving pressure chamber e via a passage m. The A valve and the B valve are connected in series to the inlet passage a and the outlet passage d2 by passages p and q2 to make the main valve driving pressure chamber e function as an operating pressure chamber for driving the main valve unit.

The C valve closes when the differential pressure across the orifice 16 disposed in the passage of the main valve unit increases beyond a predetermined value and opens when the same drops below the predetermined value. The C valve is placed in series to the passage across the A valve.

Referring to FIG. 1, the A valve has a valve casing 21 provided with an A valve element chamber g, a intermediate chamber h and a secondary pressure chamber k, a valve top 22, a pressure receiving plate 23, a sealing member 26, and a valve stem 25 holding both an A valve element 24 and the pressure receiving plate 23. A spring 27, i.e., a predetermined pressure means, is contained in a spring chamber j defined by the valve top 22. The A valve element 24 is provided with the sealing member 24s to secure a highly watertight sealing joint.

As shown in FIG. 1, the B valve has a valve casing 31 provided with a B valve element chamber i, an intermediate chamber h and a secondary pressure chamber k, a valve top 32, a pressure receiving plate 33, a sealing member 36, and a valve stem 35 holding both a B valve element 34 and the pressure receiving plate 33. A spring 37, i.e., a predetermined pressure means, is contained in a spring chamber j defined by the valve top 32. The B valve element 34 need not secure a watertight sealing joint and may allow slight leakage when the B valve is closed. Naturally, the B valve element 34 may be provided with a sealing member to secure a highly watertight joint.

As shown in FIG. 1, the C valve has a valve casing 41 provided with a C valve element chamber n and an upstream side orifice pressure chamber u, a valve top 42, a pressure receiving plate 43, a sealing member 46, and a valve stem 45 holding both a C valve element 44 and the pressure receiving plate 43. A spring 47, i.e., a predetermined pressure means, is contained in a spring chamber j defined by the valve top 42. This spring chamber j also forms a downstream side orifice pressure chamber w. The C valve element 44 need not secure a watertight sealing joint and may allow slight leakage when the C valve is closed. Naturally, the C valve element 44 may be provided with a sealing member to secure a highly watertight joint.

The B valve element chamber i of the B valve is connected to the inlet passage a of the primary pressure via the passage p. The intermediate chambers h of the A valve and the B valve are connected to the main valve driving pressure chamber e via the passage m. The A valve element chamber g of the A valve is connected through the C valve element chamber n of the C valve to the outlet passage d2 of the secondary pressure by the passage q2. The secondary pressure chambers k of the A valve and the B valve are connected to the outlet passage d2 of the secondary pressure by the passage q2. The upstream side orifice pressure chamber u and the downstream side orifice pressure chamber w of the C valve are connected to an upstream side passage d1 on the upstream side of the orifice 16 and the outlet passage d2 on the downstream side of the orifice by a passage q1 and the passage q2, respectively.

The operation of the invention will be described with reference to FIG. 1 showing the automatic-control valve device in the first embodiment.

The automatic-control valve device shown in FIG. 1 is placed in a fluid conducting pipeline. In an initial stage of passing water through the automatic-control valve device, the pressure in the outlet passage d2 is below a predetermined pressure, and the resilience of the spring 37 of the B valve is higher than a force resulting from the secondary pressure applied to the secondary pressure chamber k and hence the B valve element 34 of the B valve is seated on the valve seat to close the B valve. Consequently, the fluid of the primary pressure is unable to flow through the passage p, the B valve element chamber i, the intermediate chamber h and the passage m into the main valve driving pressure chamber e of the main valve unit. Therefore, the main valve element 5 is forced to move gradually from a fully closed position toward a fully open position by a force produced by a pressure difference corresponding to the difference in pressure receiving area between the main valve driving member 6 and the main valve element 5 to allow the fluid to flow through the passages a, b, d1 and d2. Thus, the main valve unit exercises an excellent operating characteristic to avoid abnormal rise in the secondary pressure even if the water pump or the like is started up suddenly.

After the secondary pressure in the outlet passage d2 has increased to a predetermined level, the valve elements 24 and 34 of the A valve and the B valve move according to the variation of the secondary pressure due to the variation of fluid consumption rate in the downstream passage to regulate the position of the main valve element 5 by properly regulating the pressure in the main valve driving pressure chamber e so that the predetermined secondary pressure is maintained.

In this state where the automatic-control valve device is thus functioning as a constant-pressure valve, the resilience of the spring 47 of the C valve is higher than a force corresponding to the pressure difference across the orifice 16 if the fluid consumption rate in the downstream passage is below a predetermined limit and hence the C valve element 44 of the C valve is at a fully open position and the C valve does not affect the flow of the fluid through the A valve and the B valve into the passage q2; that is, the C valve does not interfere with the function of the automatic-control valve device as a constant-pressure valve.

If the fluid consumption rate in the downstream passage is excessively high and is almost exceeding the predetermined limit, the pressure difference across the orifice 16 rises according to the increase of the fluid consumption rate in the downstream passage, and a force resulting from the pressure difference acting on the pressure receiving plate 43 of the C valve exceeds the resilient of the spring 47. Consequently, the C valve element 44 is moved in a closing direction to reduce the sectional area of the passage connected to the passage q2, i.e., the C valve interferes with the operation of the automatic-control valve device as a constant-pressure valve, and the pressure in the main valve driving pressure chamber e of the main valve unit increases toward the primary pressure. Then, the main valve element 5 is moved in a closing direction by the difference between pressures acting on the front and the back surface thereof, respectively, so that the main valve opening b is reduced to maintain the flow rate of the fluid flowing through the main valve unit at the predetermined value.

The secondary pressure can be set to a predetermined value simply by adjusting the respective resiliences of the springs 27 and 37 of the A valve and the B valve by operating adjusting screws, respectively. The flow of the fluid can be adjusted to a desired flow rate by adjusting the position of the orifice 16 by operating the handwheel 17.

When the use of the fluid in the downstream passage is ended and an operation to close a downstream passage is started, the secondary pressure rises accordingly, the forces corresponding to the secondary pressure acting on the respective pressure receiving plates 23 and 33 of the A valve and the B valve exceeds the respective resiliences of the springs 27 and 37. Consequently, the A valve element 24 is fully closed and the B valve element 34 is fully opened, so that the pressure in the main valve driving pressure chamber e increases toward the primary pressure, and the main valve element 5 is moved in a closing direction by the difference between thrusts acting respectively on the front and the back surface of the main valve element 5. As a result, the main valve opening b is closed, and the predetermined secondary pressure is maintained.

The pressure difference across the orifice 16 decreases as the flow rate of the fluid decreases with the closing of the downstream passage. Consequently, the resilience of the spring 47 of the C valve exceeds a force corresponding to the pressure difference across the orifice 16, and the C valve element 44 of the C valve is returned to its fully open position. In this state, the C valve does not interfere with the operation of the automatic-control valve device as a constant-pressure valve.

The sealing member 5s put on the main valve element 5 and the sealing member 24s put on the A valve element 24 must secure a perfect watertight joint in a state where the main valve unit is closed completely. The sealing members 5s and 24s are able to secure a watertight joint easily by a conventional technique. The sealing member 12 put on the main valve driving member 6 is difficult to fabricate with precision. However, the fluid will not leak from the upstream side into the downstream side and the abnormal rise of the secondary pressure will not occur even if the sealing member 12 forms a rough watertight joint.

Since the pilot valves, i.e., the A valve, the B valve and the C valve, are not provided with any fixed restricting device, such as a needle valve, the pilot valves are rarely clogged with sand or dust. Even if any one of the main valve unit, the A valve, the B valve and the C valve should be clogged, the clogged valve is caused to open automatically by a change in the fluid pressure caused by the clogged valve and the clogged valve is able to exercise its self-cleaning function to remove sand or dust clogging the same. Accordingly, the automatic-control valve device need not be provided with a strainer of a fine mesh or the like, which makes the maintenance of the automatic-control valve device easy.

Automatic-control valve devices in second to eighth embodiments of the present invention will be described with reference to FIGS. 2 to 8, in which like or corresponding parts are designated by the same reference characters.

Figure 2:
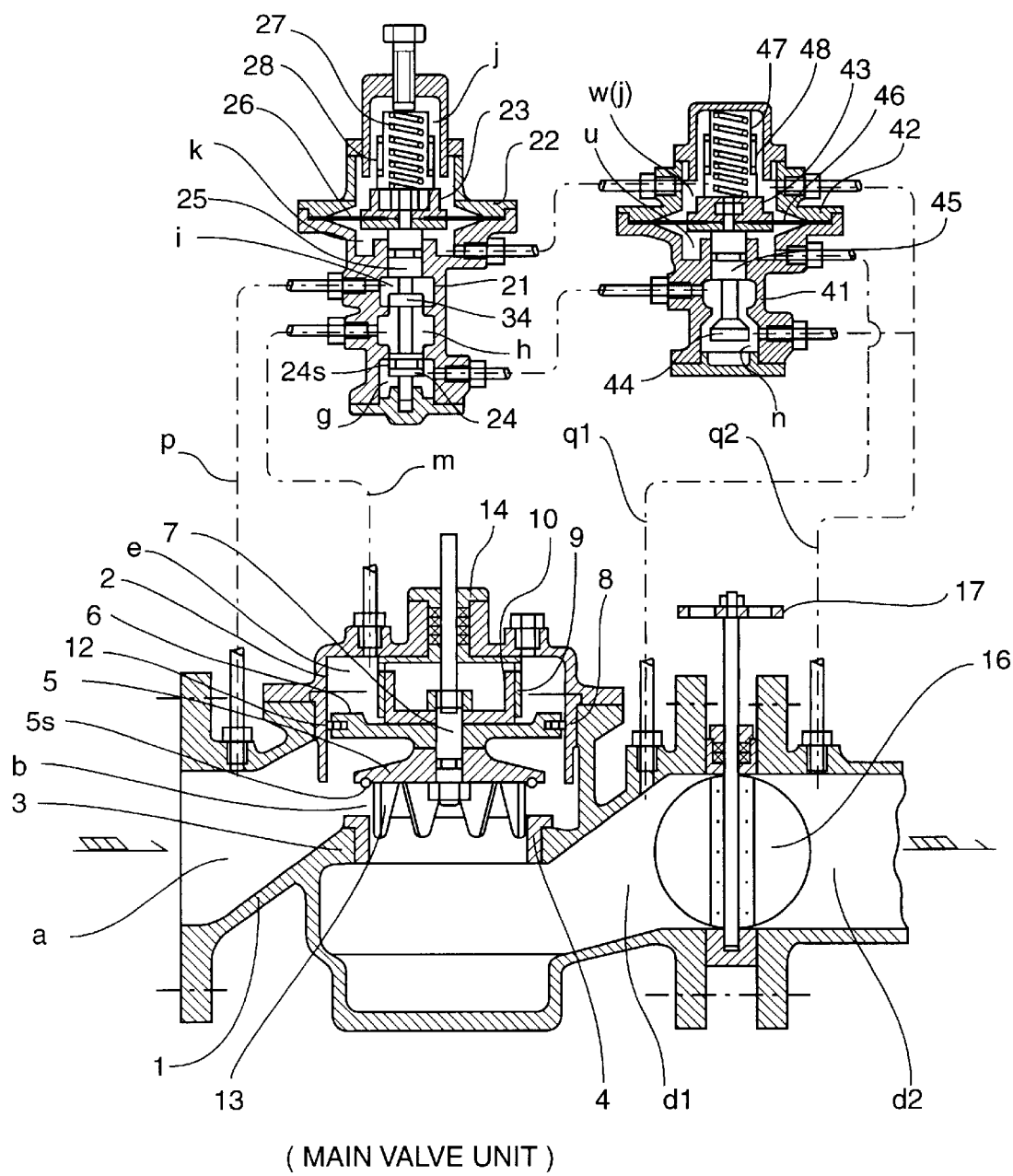
FIG. 2 is a longitudinal sectional view of an automatic-control valve device in a second embodiment of the present invention.

As shown in FIG. 2, the automatic-control valve device in the second embodiment has an A.B compound valve, which is a combination of the A valve and the B valve employed in the first embodiment. The A.B compound valve has a cylinder-piston valve operating mechanism formed by mounting an A valve element 24 and a B valve element 34 on a single valve stem 25, and the valve stem 25 is operatively connected to a single predetermined pressure means (spring 27). The A.B compound valve is so formed that the A valve element 24 and the B valve element 34 may not obstruct each other. Both the A valve element 24 and the B valve element 34 are at a substantially close deposition while the secondary pressure is stable. Although the second embodiment employing the A.B compound valve formed by combining the A valve and the B valve of the first embodiment differs somewhat in the arrangement of passages from the first embodiment, the second embodiment is similar in other respects, functions and effects to the first embodiment, and hence the further description thereof will be omitted.

Figure 3:
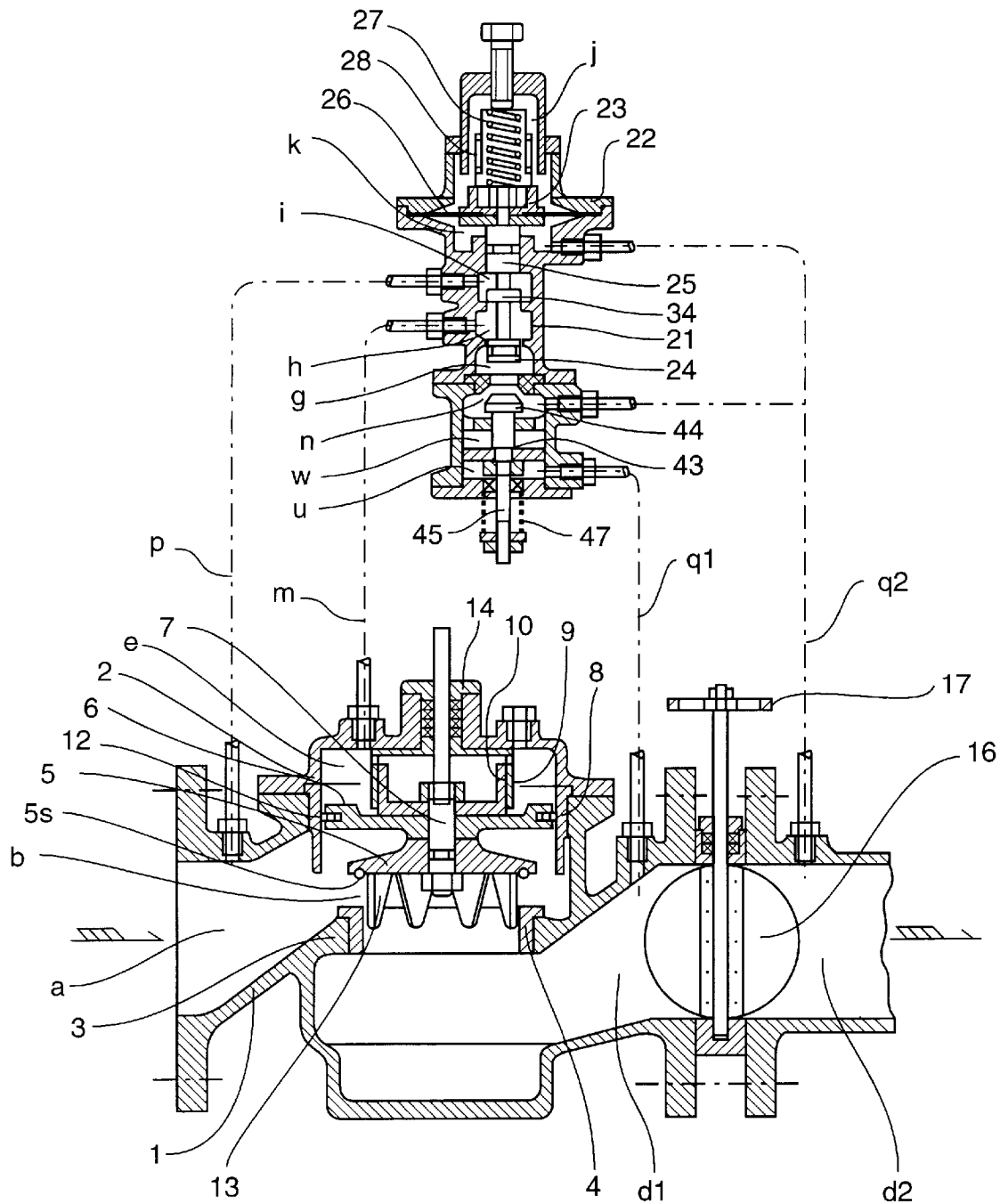
FIG. 3 is a longitudinal sectional view of an automatic-control valve device in a third embodiment of the present invention.

As shown in FIG. 3, the automatic-control valve device in the third embodiment has an A.B.C compound valve, which is a combination of the A valve, the B valve and the C valve employed in the first embodiment. An A valve element 24 and a B valve element 34 are mounted on a valve stem 25, and a C valve element 44 is mounted on a valve stem 45. The valve stems 25 and 45 are able to move independently. Although the third embodiment employing the A.B.C compound valve formed by combining the A valve, the B valve and the C valve of the first embodiment differs somewhat in the arrangement of passages from the second embodiment, the third embodiment is similar in other respects, functions and effects to the second embodiment, and hence the further description thereof will be omitted.

In the automatic-control valve device shown in FIG. 3, the resilience of a spring 47, i.e., a predetermined pressure means, included in the C valve can be adjusted by means of an adjusting screw. The flow rate of the fluid can be adjusted to a predetermined fixed value by operating an orifice 16 by means of a handwheel 17 or the like to adjust restriction and the fine adjustment of the flow rate can be achieved simply by adjusting the resilience of the spring 47 by means of the adjusting screw.

Figure 4:
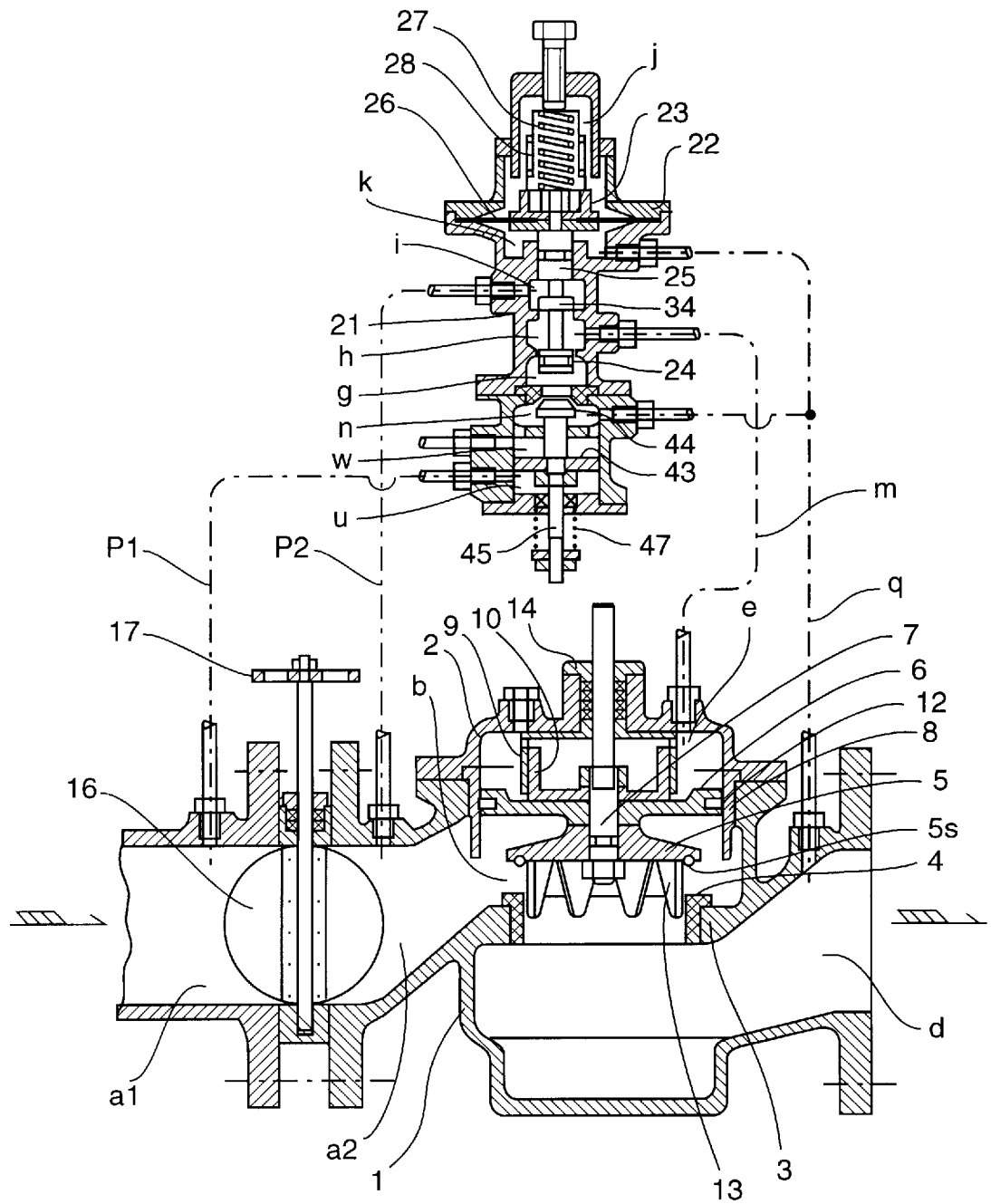
FIG. 4 is a longitudinal sectional view of an automatic-control valve device in a fourth embodiment of the present invention.

As shown in FIG. 4, the automatic-control valve device in the fourth embodiment has an orifice 16 placed between passages a1 and a2 on the upstream side of a main valve unit. The position of the orifice 16 is opposite to that of the orifice 16 of the third embodiment with respect to the main valve unit. Although the fourth embodiment differs in the arrangement of the orifice 16 from the third embodiment, and hence the arrangement of passages such as p1 and p2 is somewhat difference from that in the third embodiment accordingly, the fourth embodiment is similar in other respects, functions and effects to the third embodiment, and hence the further description thereof will be omitted.

Figure 5:
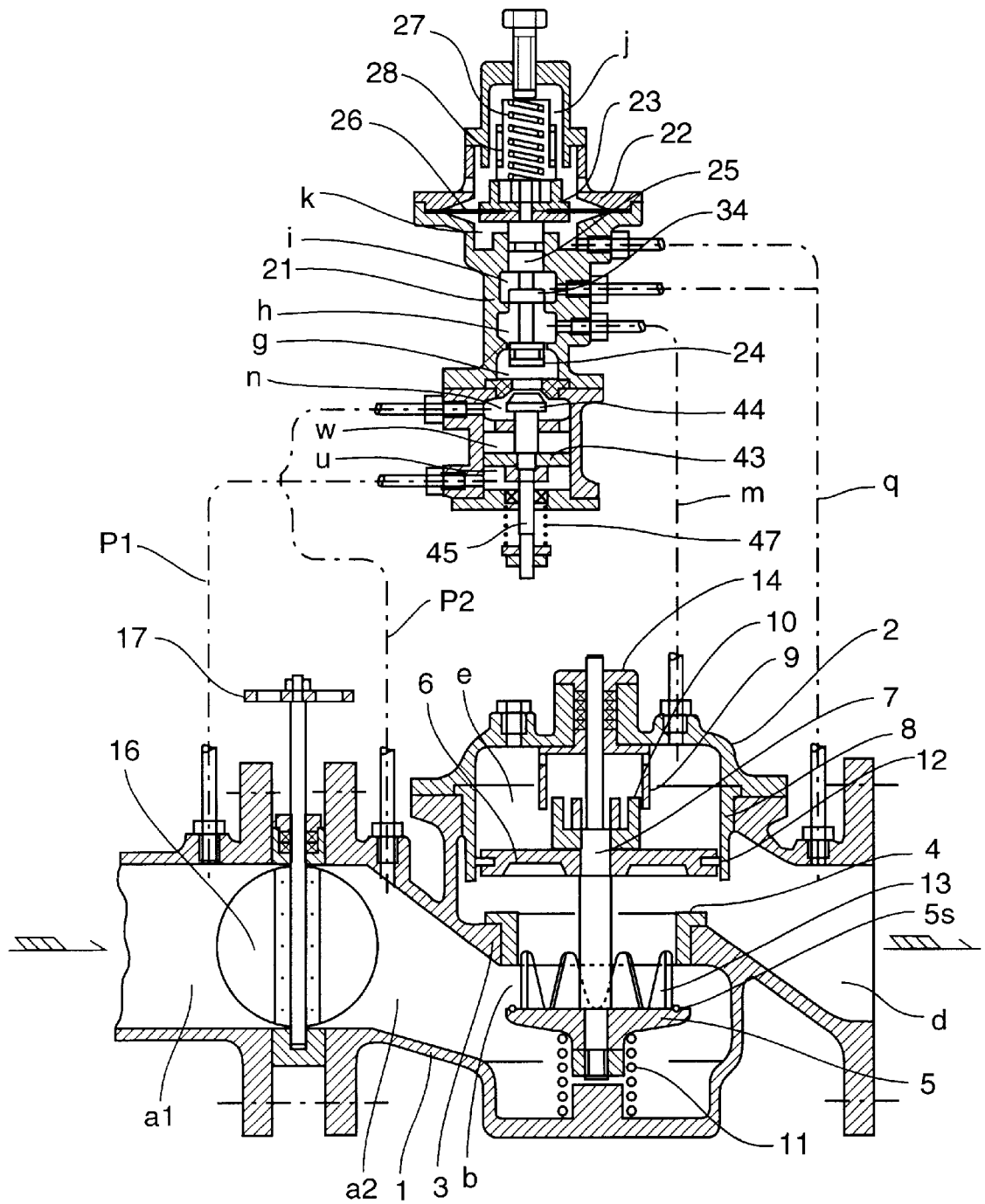
FIG. 5 is a longitudinal sectional view of an automatic-control valve device in a fifth embodiment of the present invention.

As shown in FIG. 5, the automatic-control valve device in the fifth embodiment has a main valve driving member 6 disposed on the downstream side of a main valve seat 4. The disposition of the main valve driving member 6 is opposite to that of the main valve driving member 6 in the fourth embodiment with respect to the main valve seat. Although directions of movement of the main valve driving member 6 in the fifth embodiment are opposite to those of the main valve driving member 6 in the fourth embodiment and the arrangement of passages connecting the A valve and the B valve to an inlet passage a2 and an outlet passage d is reverse to that of the passages in the fourth embodiment, the fifth embodiment is similar in other respects, functions and effects to the fourth embodiment, and hence the further description thereof will be omitted.

Figure 6:
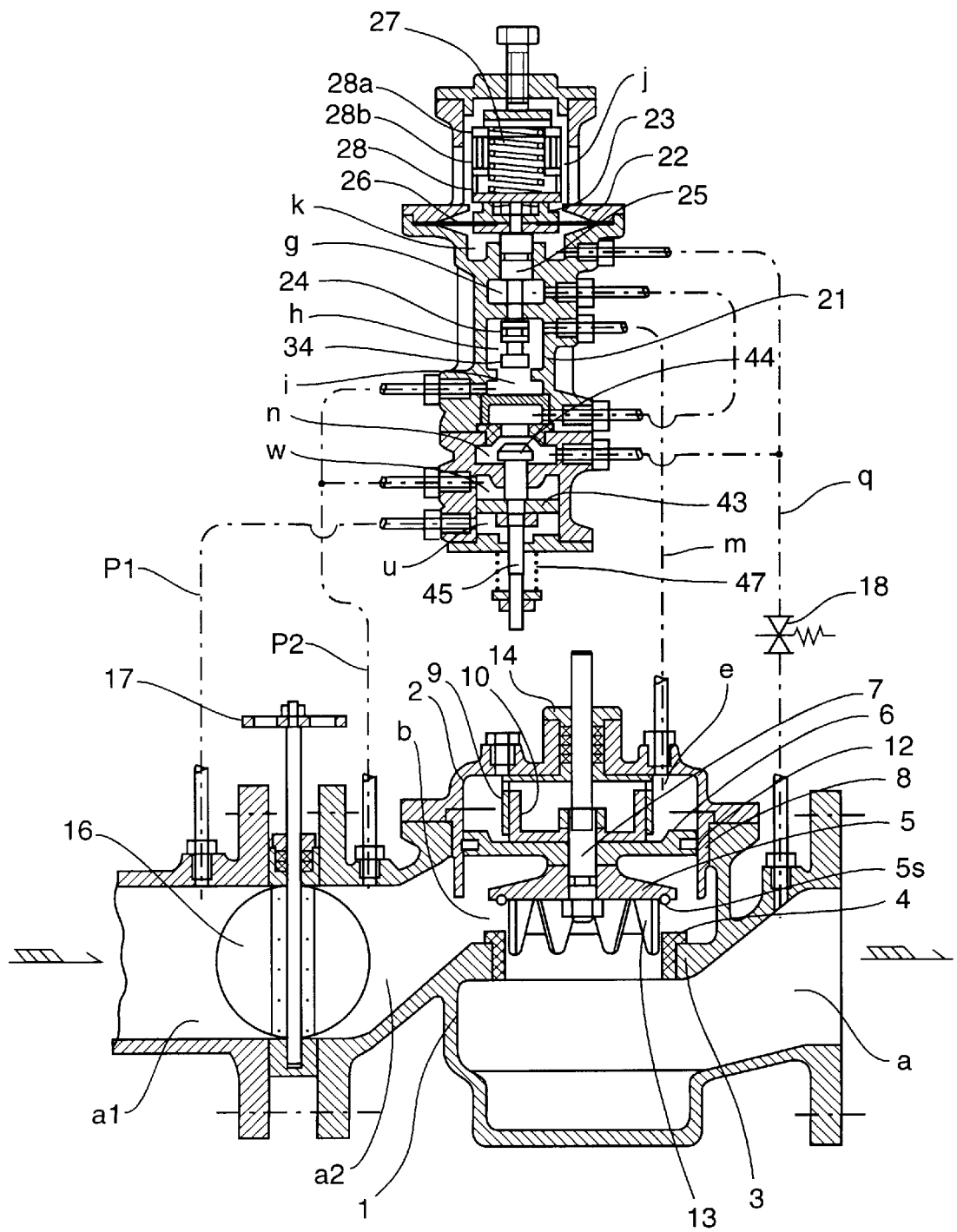
FIG. 6 is a longitudinal sectional view of an automatic-control valve device in a sixth embodiment of the present invention.

As shown in FIG. 6, the automatic-control valve device in the sixth embodiment has an A.B.C compound valve similar to that employed in the fourth embodiment, in which both an A valve element 24 and a B valve element 34 are contained in an intermediate chamber h and the arrangement of passages in the sixth embodiment differs somewhat from that of the passages in the fourth embodiment. However, the sixth embodiment is similar in other respects, functions and effects to the fourth embodiment. As shown in FIG. 6, a predetermined pressure means (spring 27) included in the A.B.C compound valve is contained in a telescopic double-cylinder case 28 consisting of an upper cylinder having a stopper 28b, and a lower cylinder having a stopper 28a which engages with the stopper 28b to limit the extension of the telescopic double-cylinder case 28.

Figure 7:
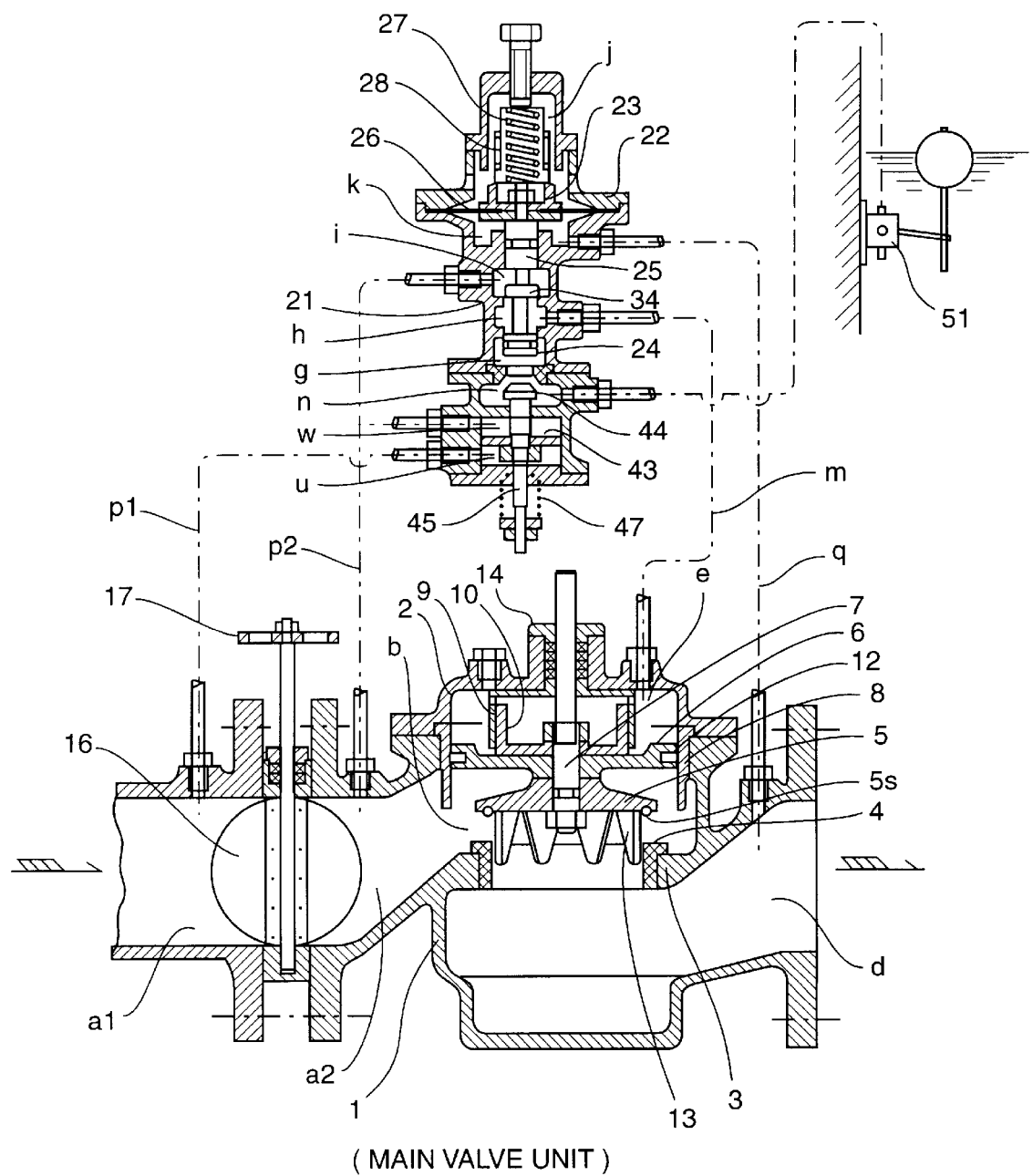
FIG. 7 is a longitudinal sectional view of an automatic-control valve device in a seventh embodiment of the present invention.

As shown in FIG. 7, the automatic-control valve device in the seventh embodiment has an A.B.C compound valve similar to that employed in the fourth embodiment, in which a C valve is connected to a float valve 51 disposed at a level near the liquid level in a downstream passage instead of connecting the same directly to an outlet passage d of the secondary pressure. The float valve 51 opens when the liquid level in the downstream passage is not higher than a predetermined level to allow the fluid to flow through the passage connected thereto and closes when the liquid level rises to the predetermined level. The float valve 51 shown in FIG. 7 is of a common type. The seventh embodiment is similar in other respects, functions and effects to the fourth embodiment.

When the A.B.C compound valve is connected to the float valve 51 disposed at a level near the liquid level in a downstream passage instead of connecting the same by a passage to the outlet passage d, the automatic-control valve device operates as a constant-pressure constant-flow valve and varies the flow rate of the fluid linearly according to the variation of the liquid level. Therefore, the fluid is discharged properly and the fluid is not supplied excessively even if the pressure in the inlet passage is high. The float valve 51 closes upon the rise of the liquid level to the predetermined level, and the pressure in a main valve driving pressure chamber e rises. Consequently, a main valve element 5 is seated automatically on a main valve seat and a sealing member 5s put on the main valve element 5 and a sealing member, now shown, included in the float valve 51 secure watertight joints, respectively.

The float valve may be of any suitable one of conventional types, such as a ball-tap type. Naturally, the float valve controlled by a float may be substituted by a valve means controlled by a liquid level sensor. The float valve may be provided in series to the C valve or may be provided in any way suitable for the installation site, instead of the manner of installation according to this embodiment.

Figure 8:
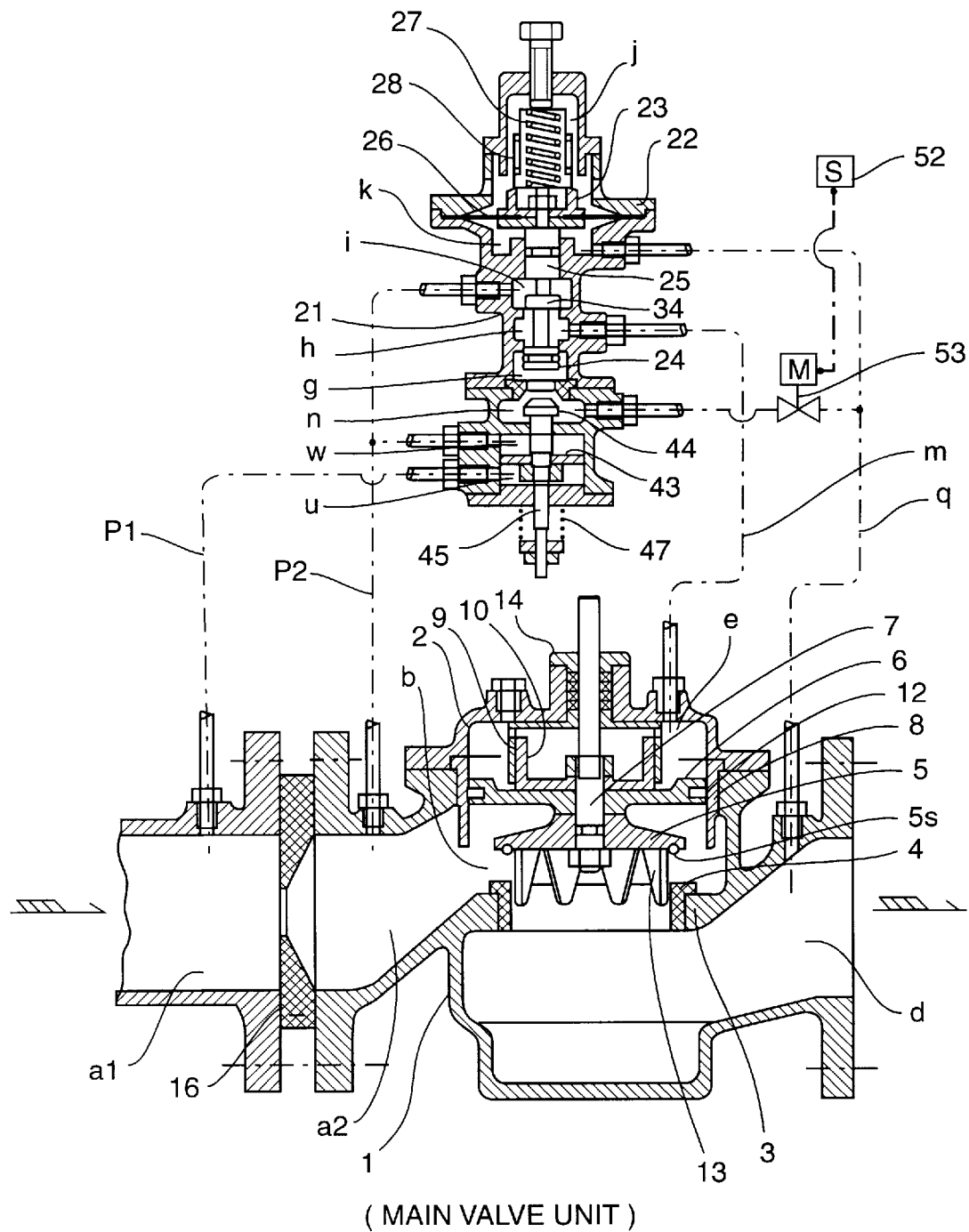
FIG. 8 is a longitudinal sectional view of an automatic-control valve device in an eighth embodiment of the present invention.
Figure 9:
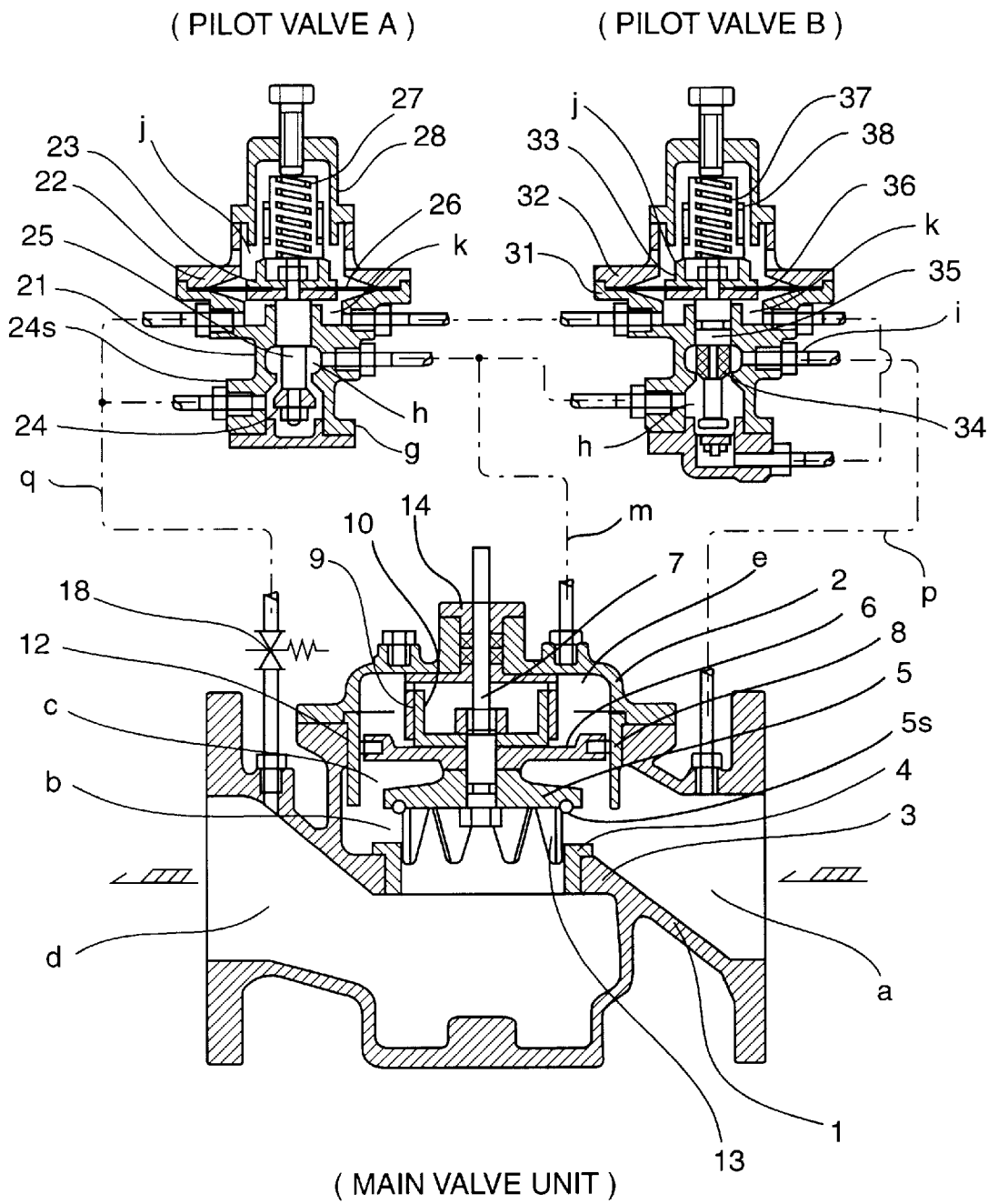
FIG. 9 is a longitudinal sectional view of a prior art automatic constant-pressure valve device.
Figure 10:
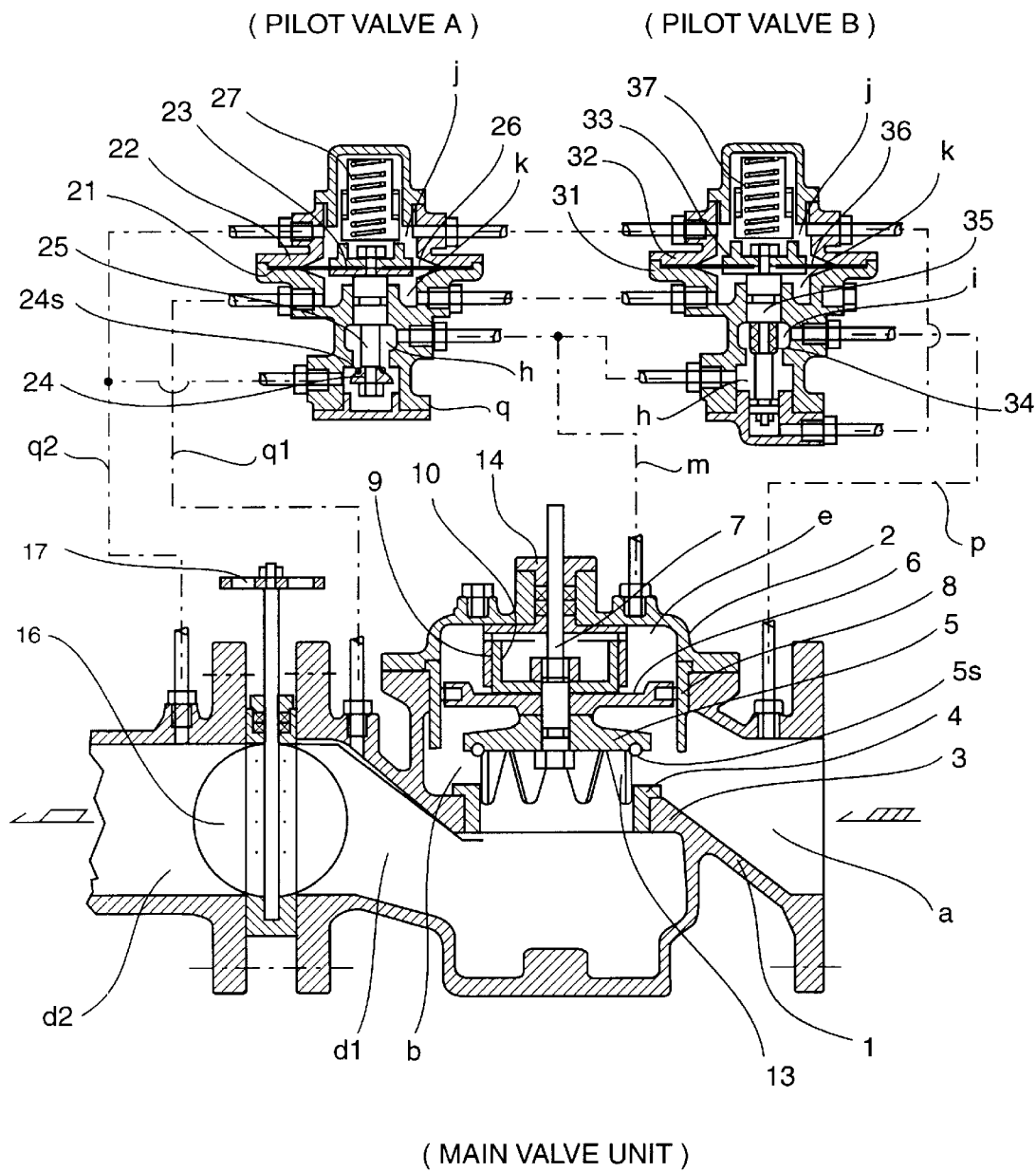
FIG. 10 is a longitudinal sectional view of a prior art automatic constant-flow valve device.
Figure 1:
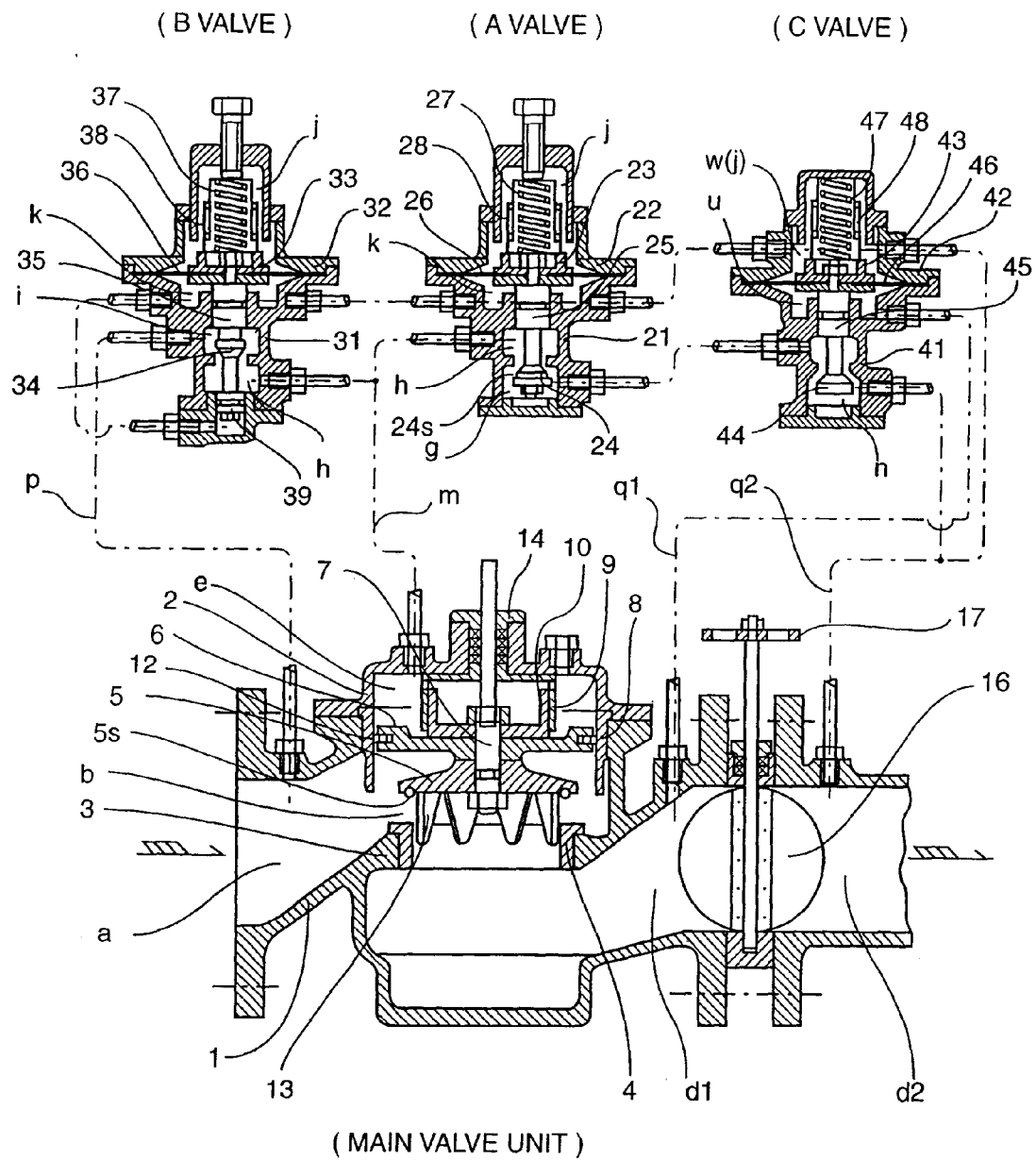
Figure 2:
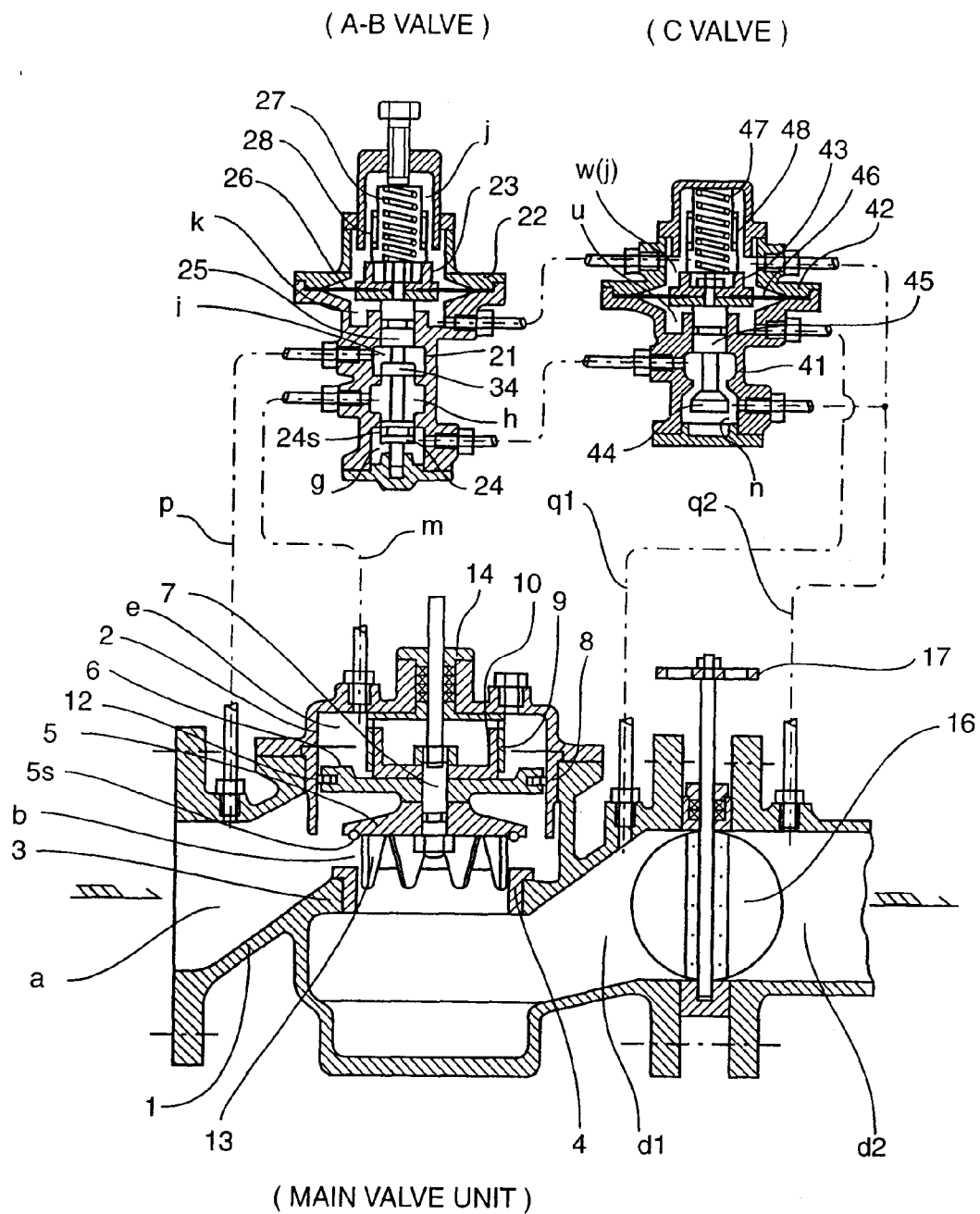
Figure 3:
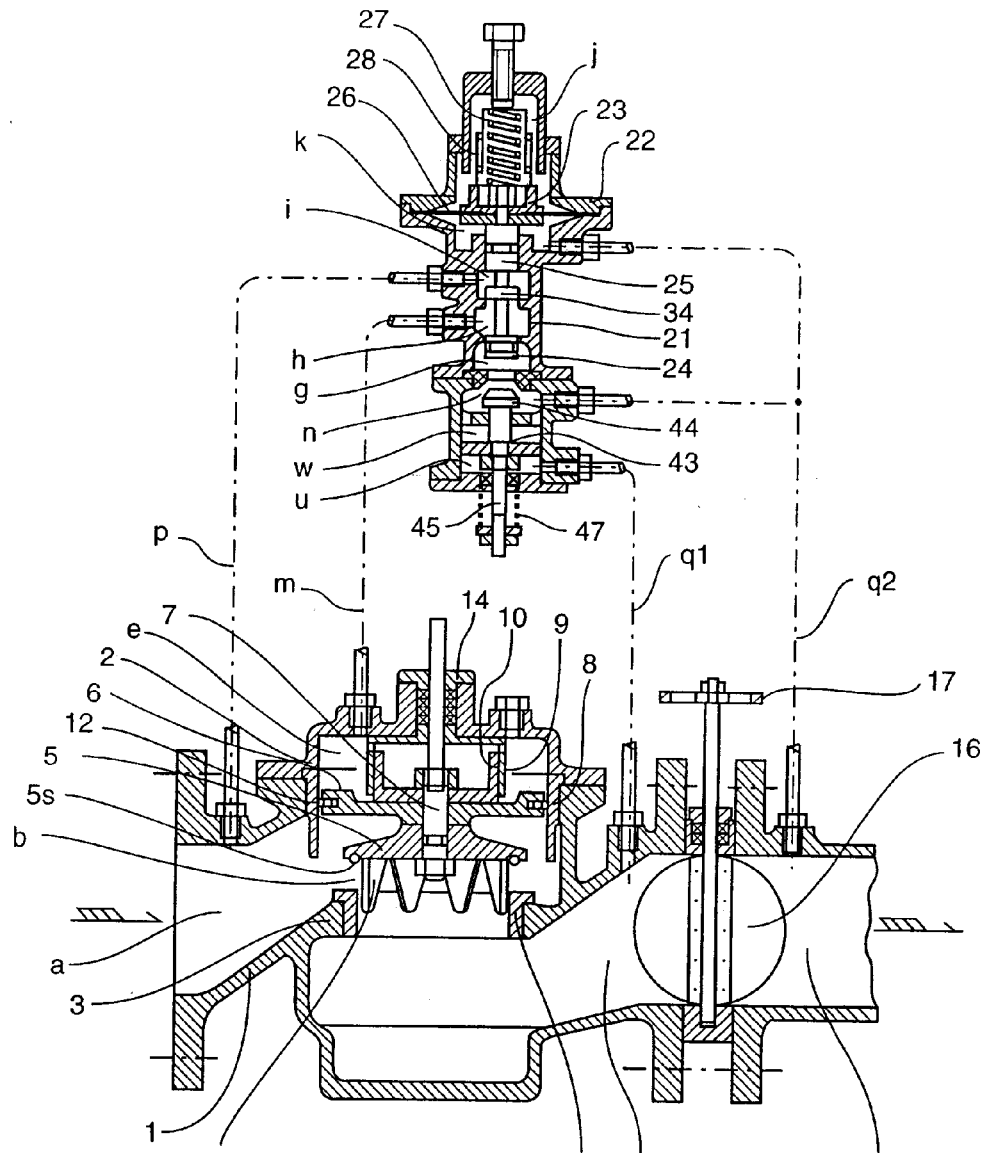
Figure 4:
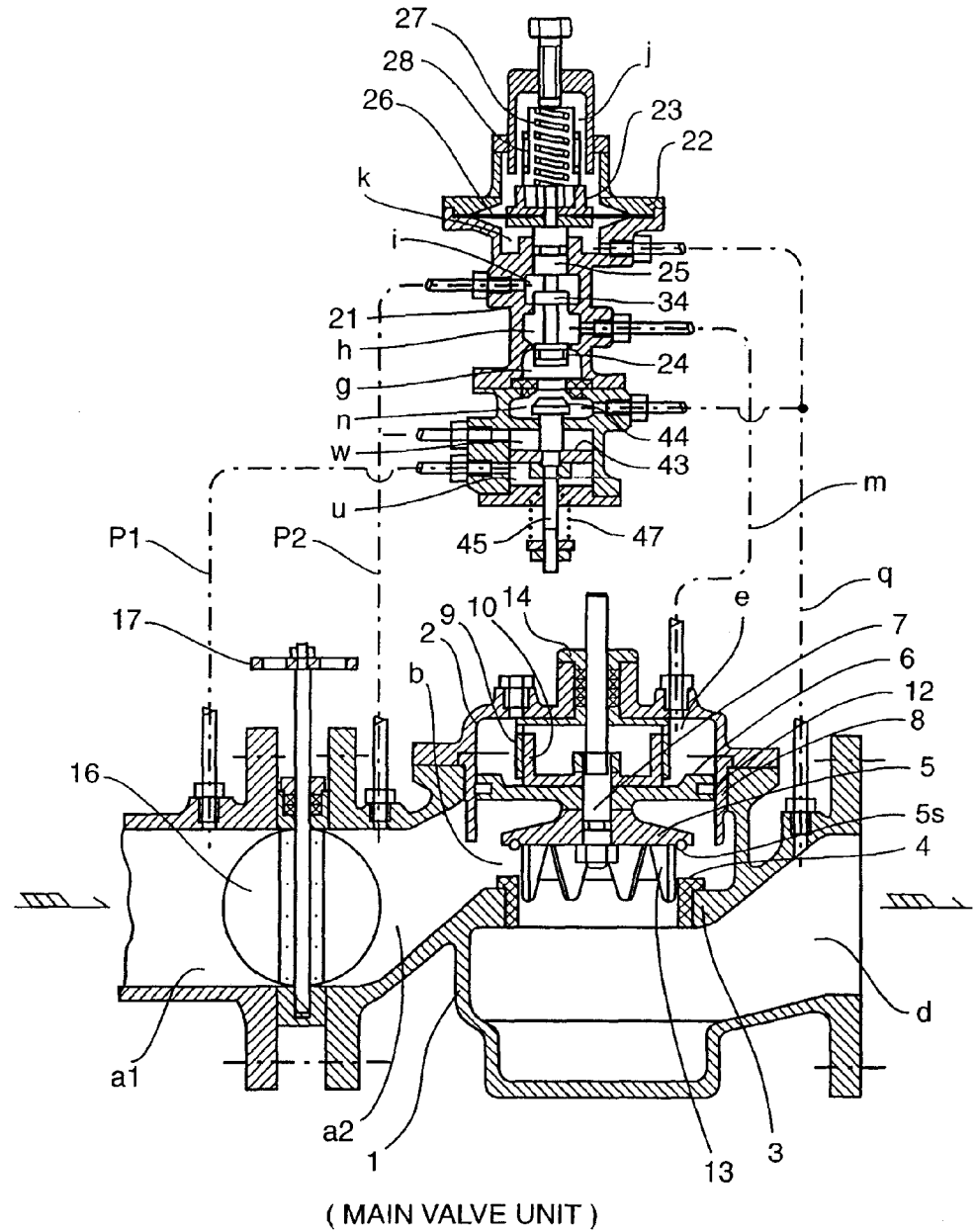
Figure 5:
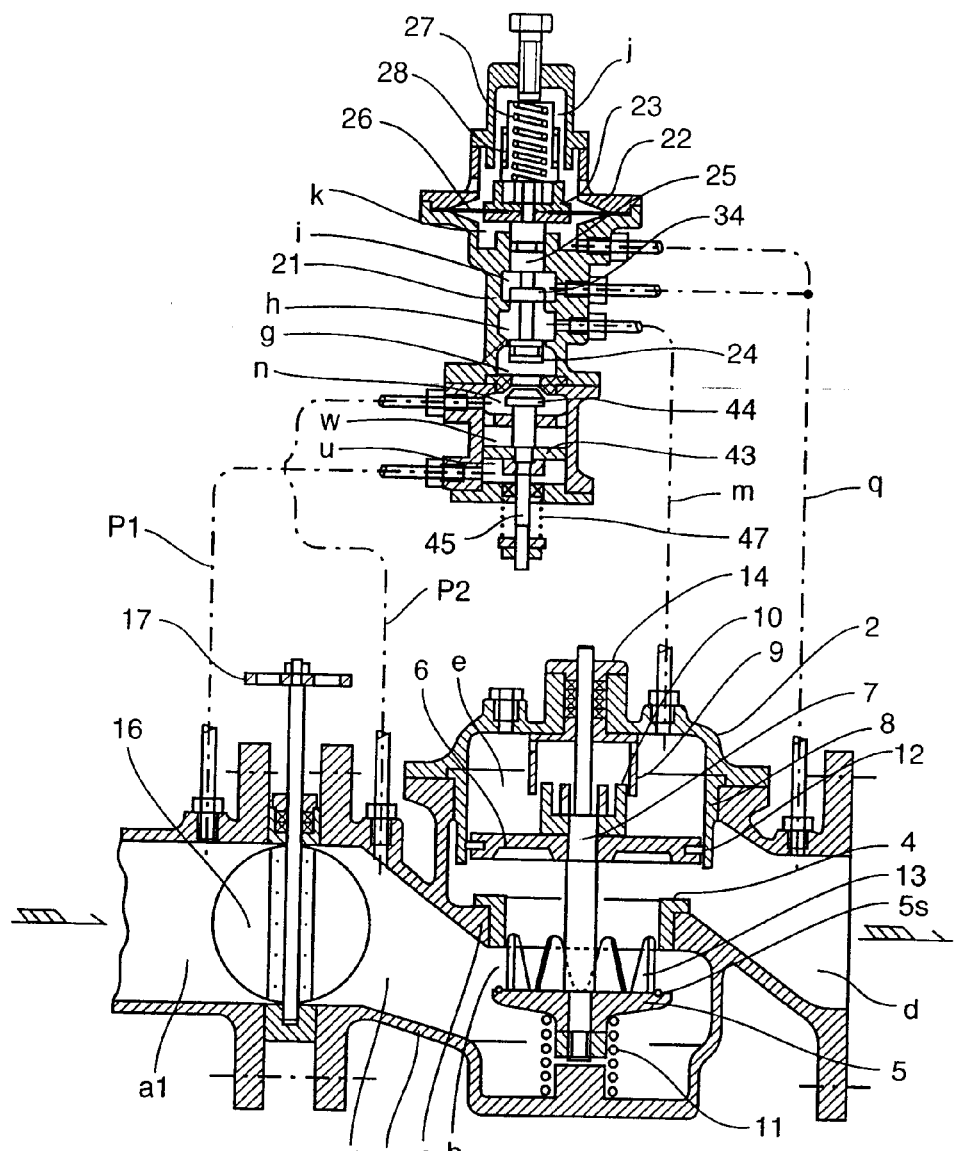
Figure 6:
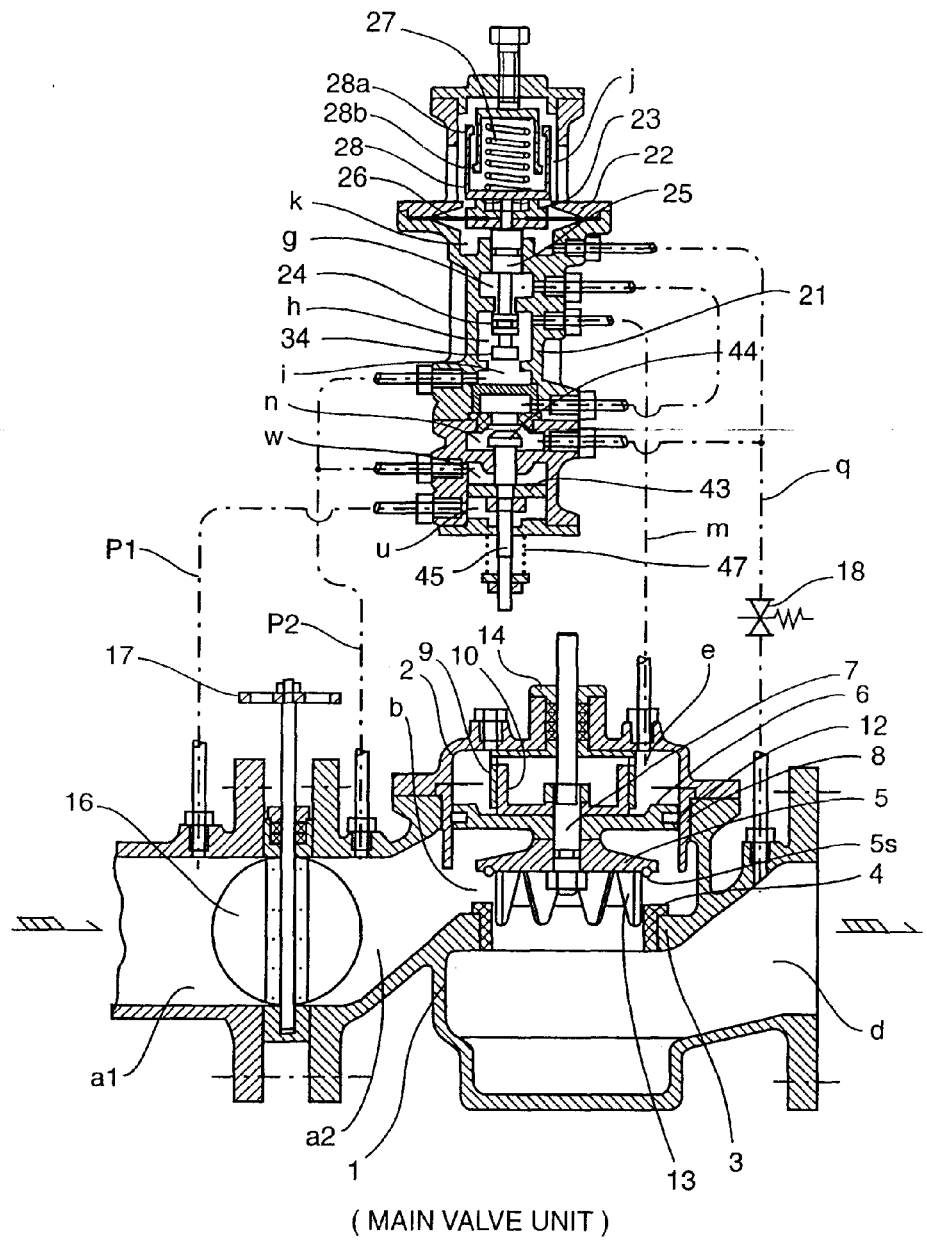
Figure 5:
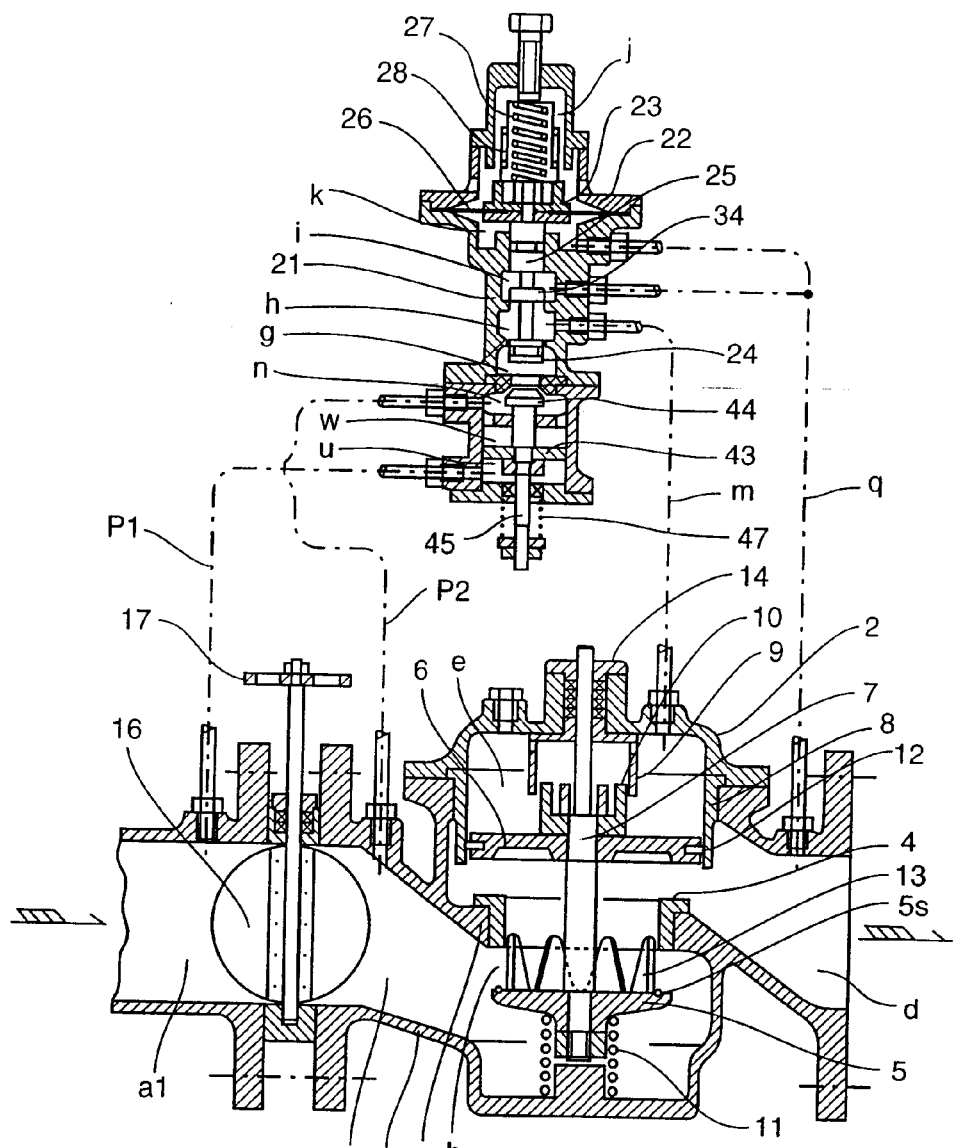
Figure 8:
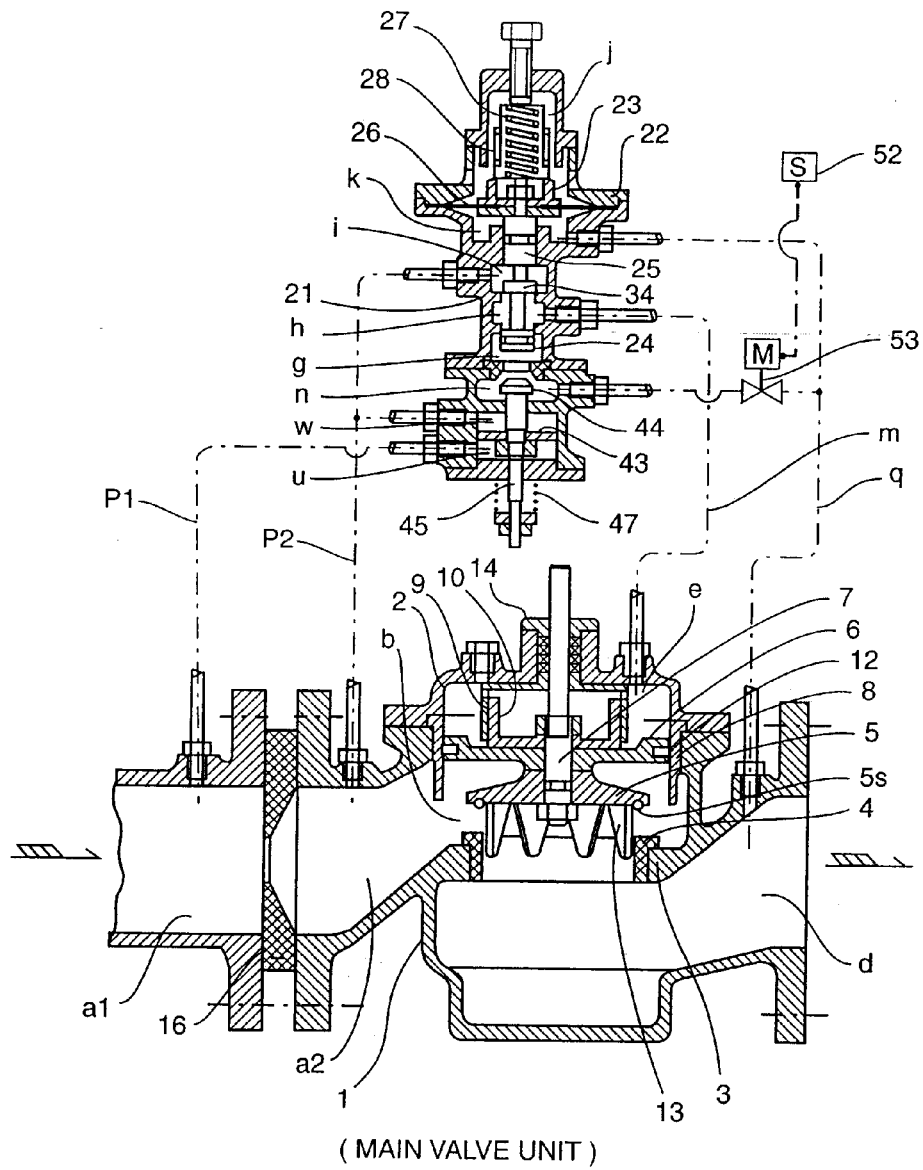
Figure 9:
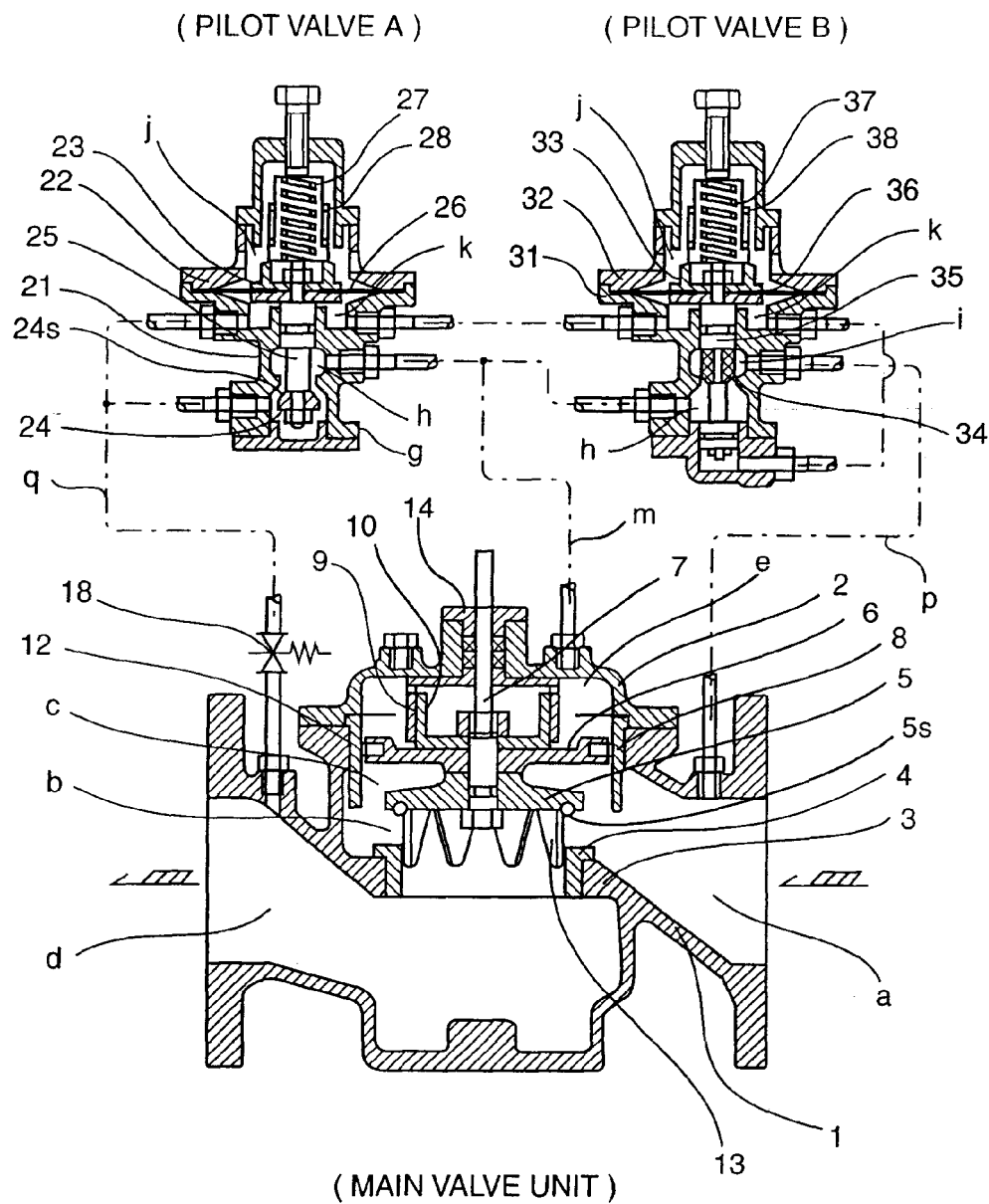
Figure 10:
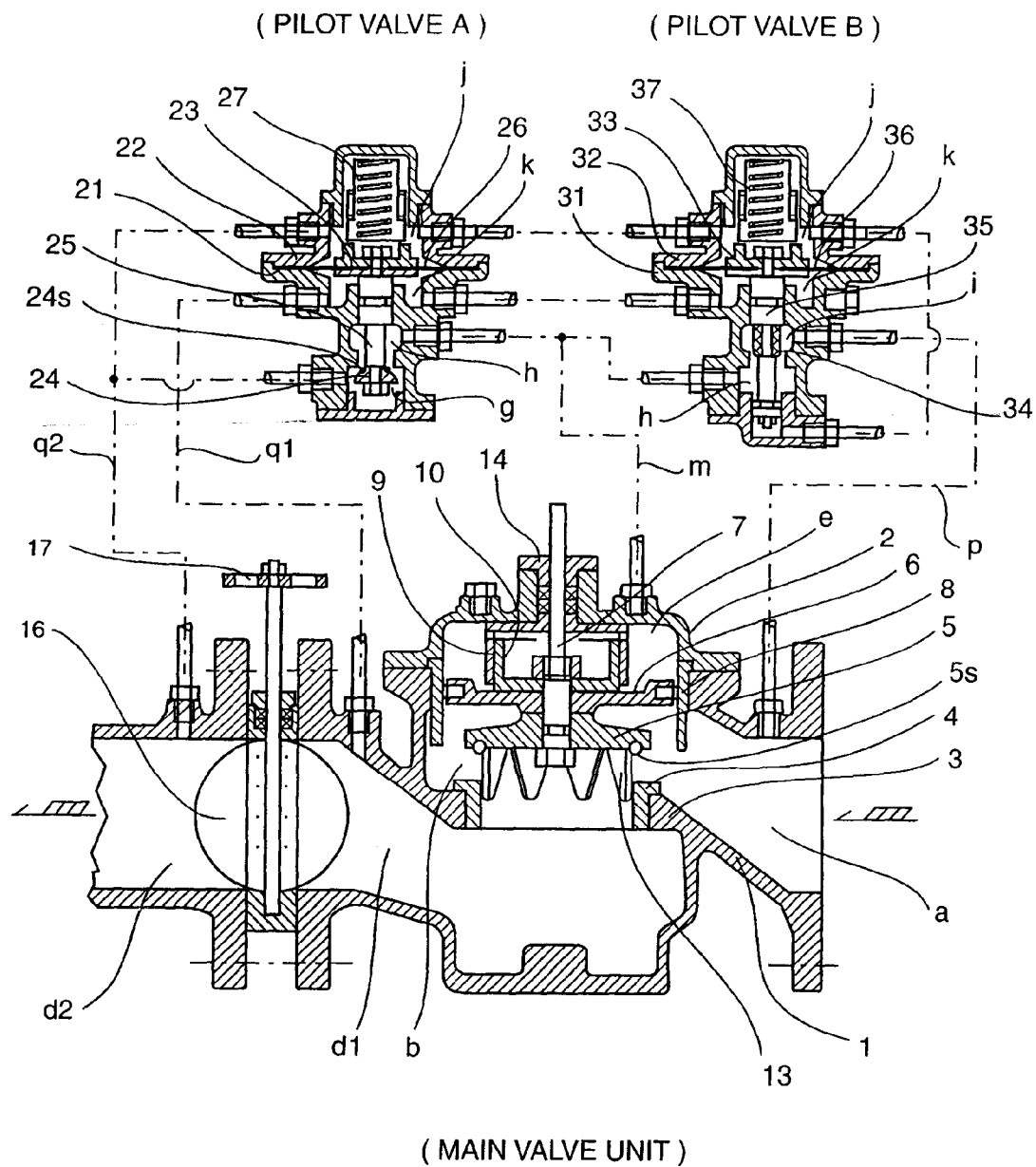
Figure 1:
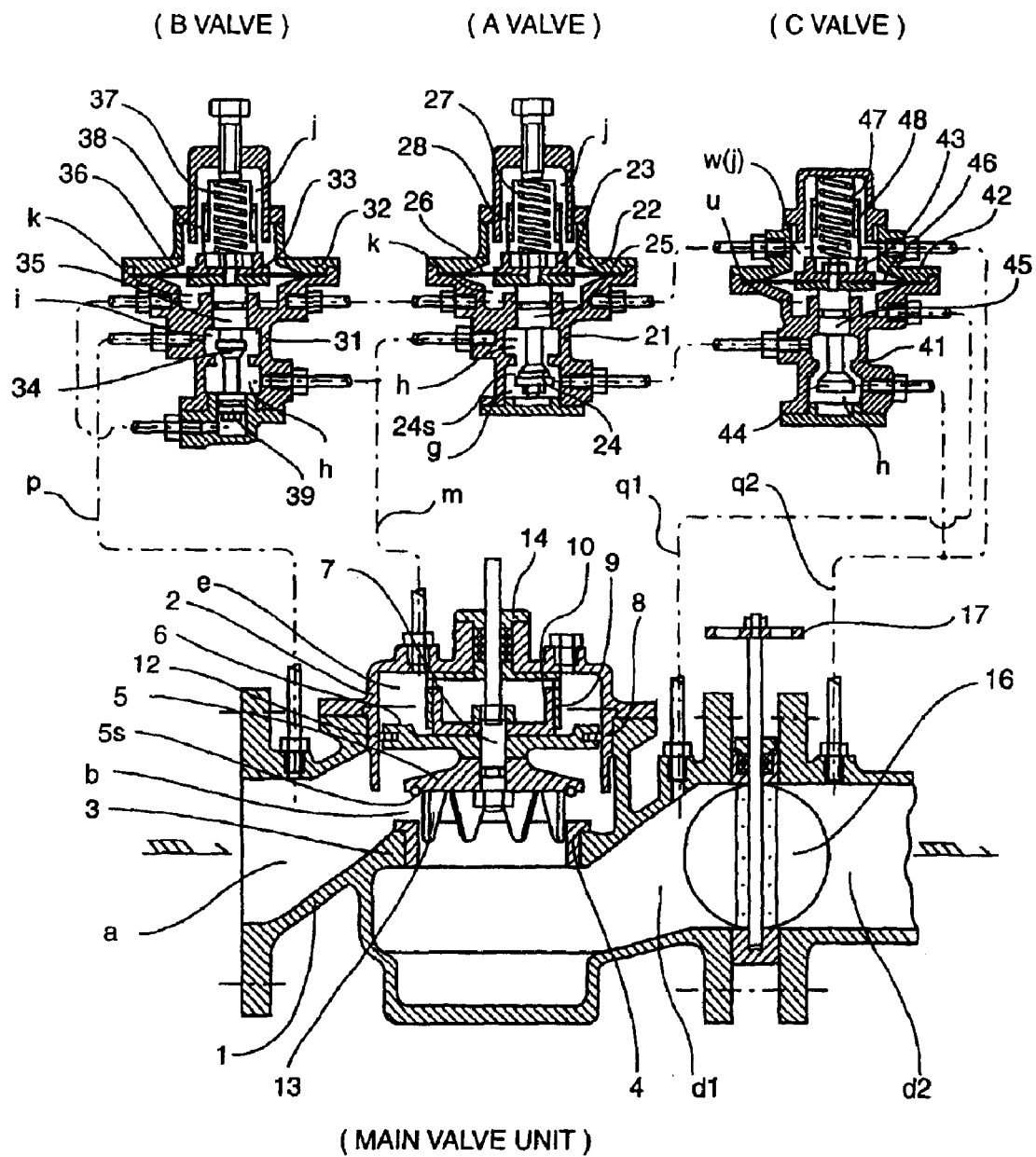
Figure 2:
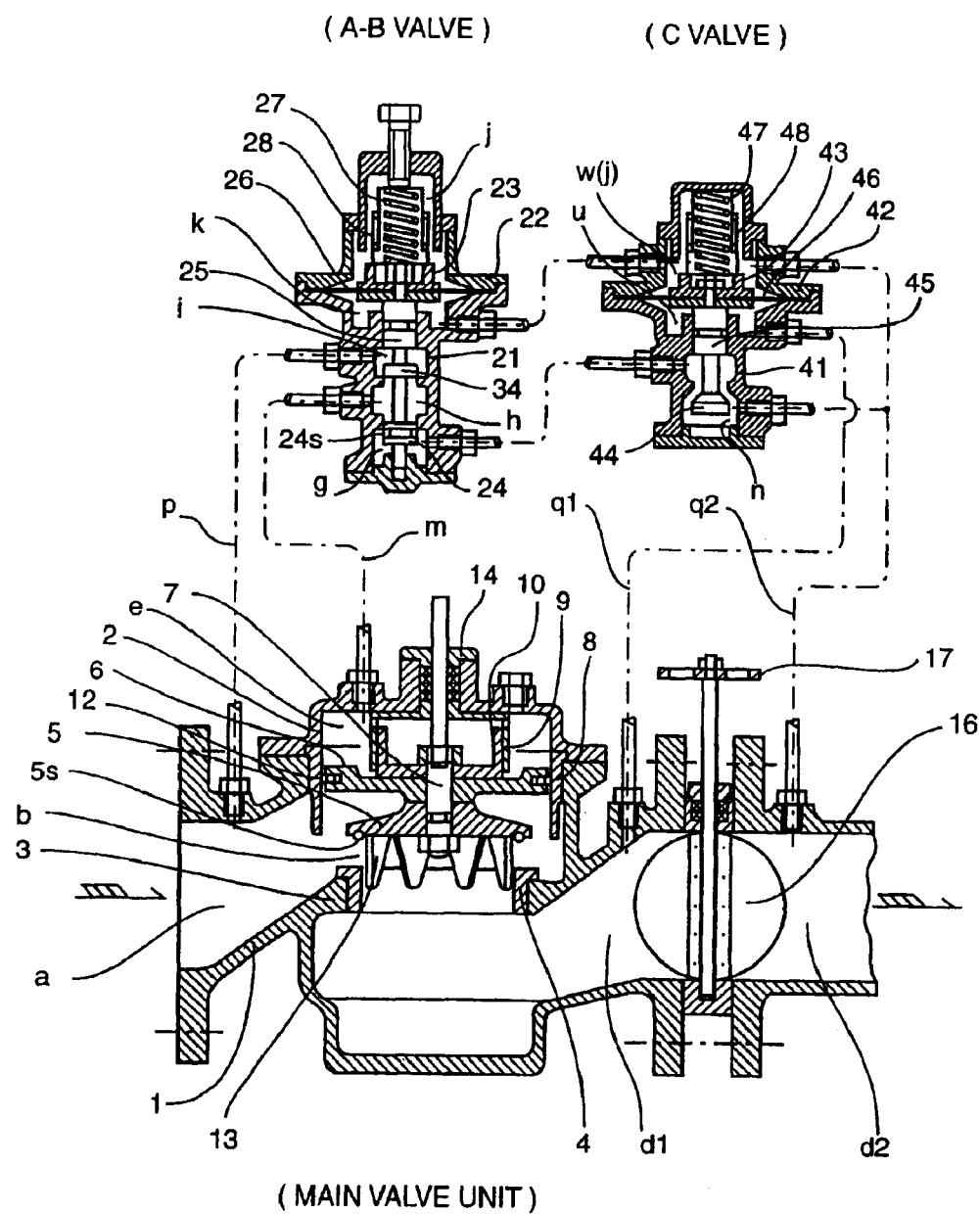
Figure 3:
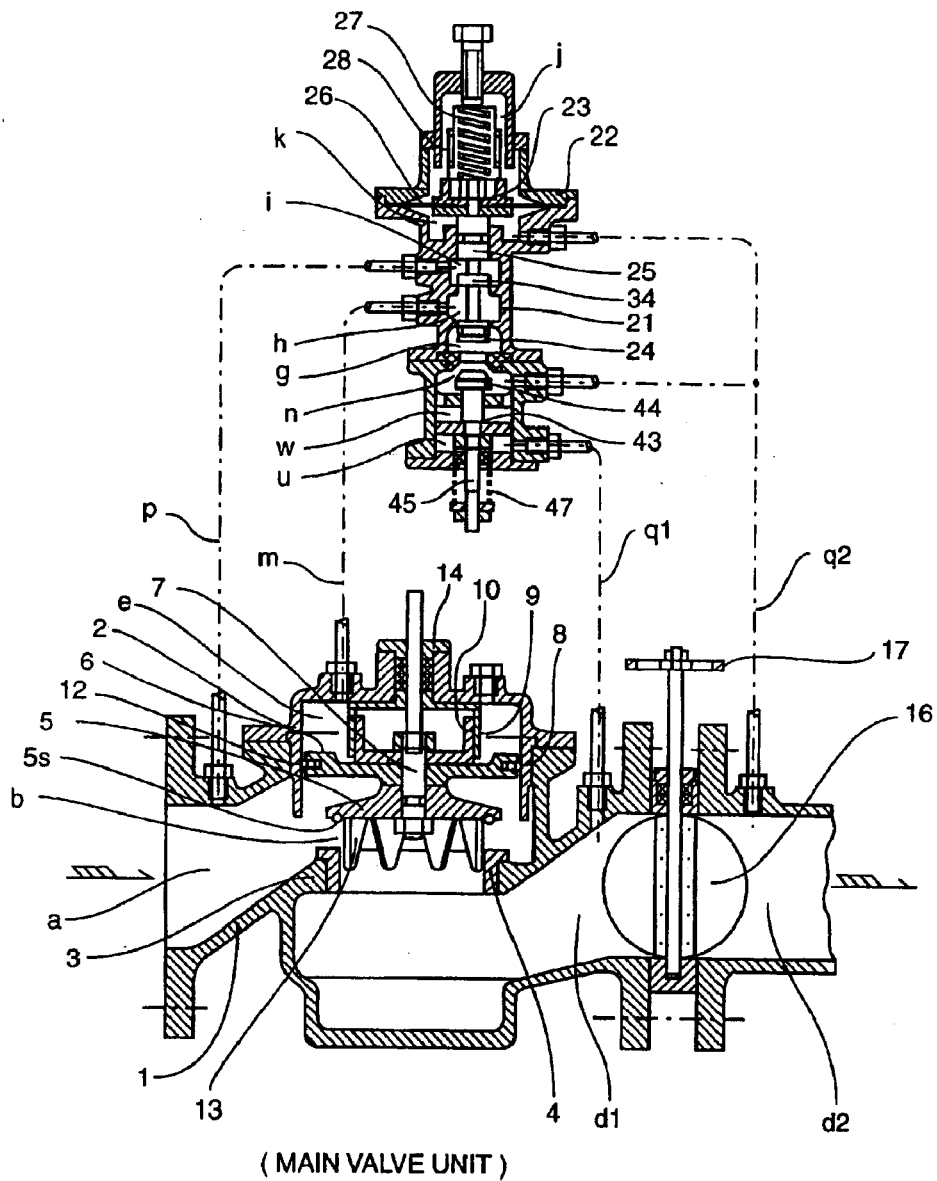
Figure 4:
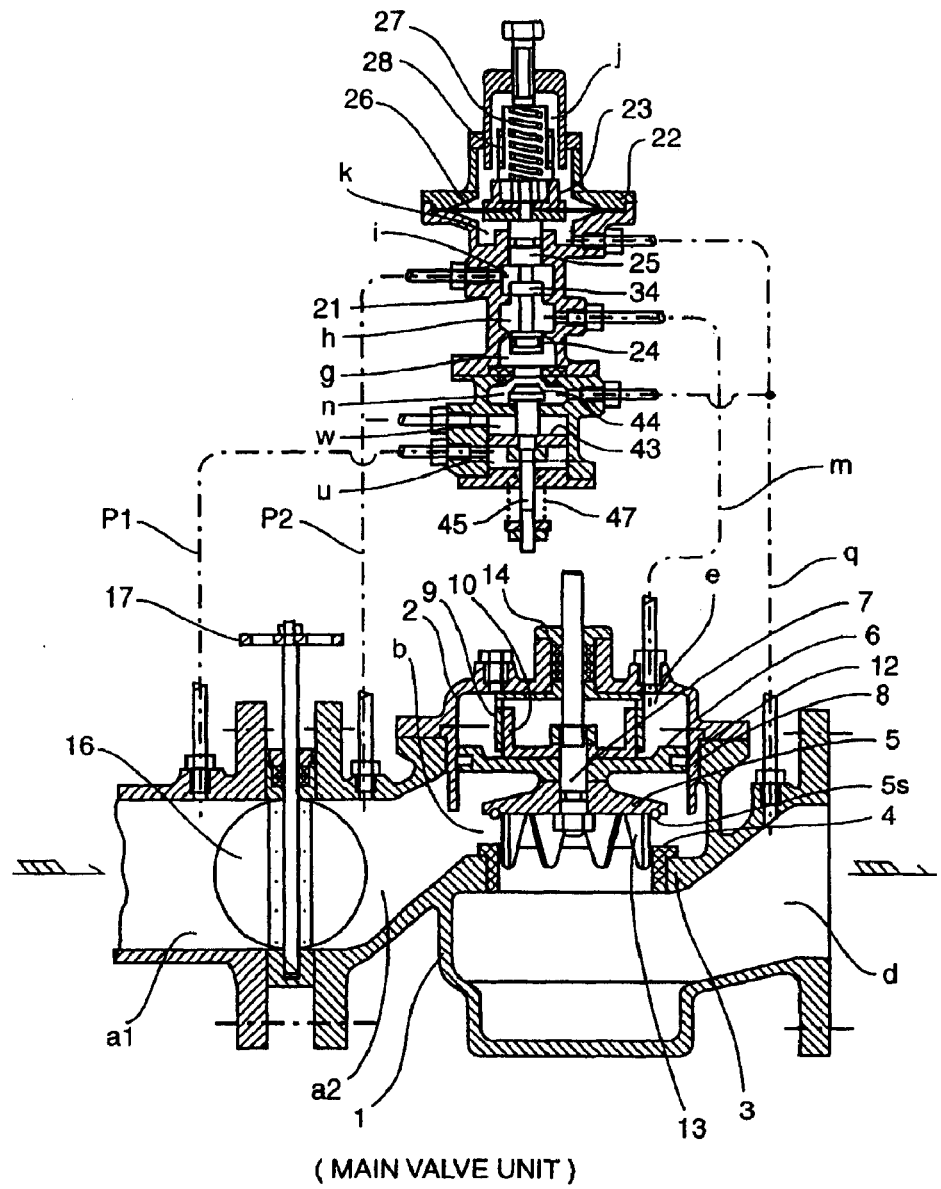
Figure 5:
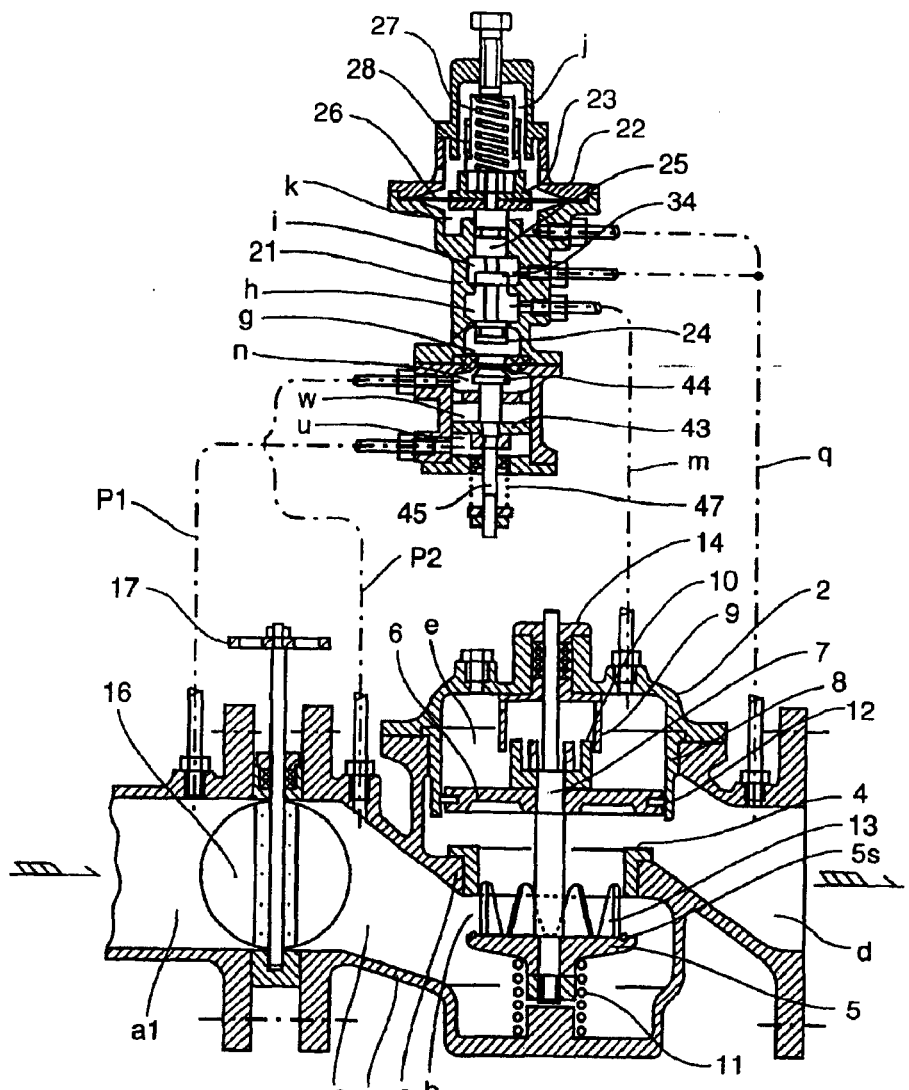
Figure 6:
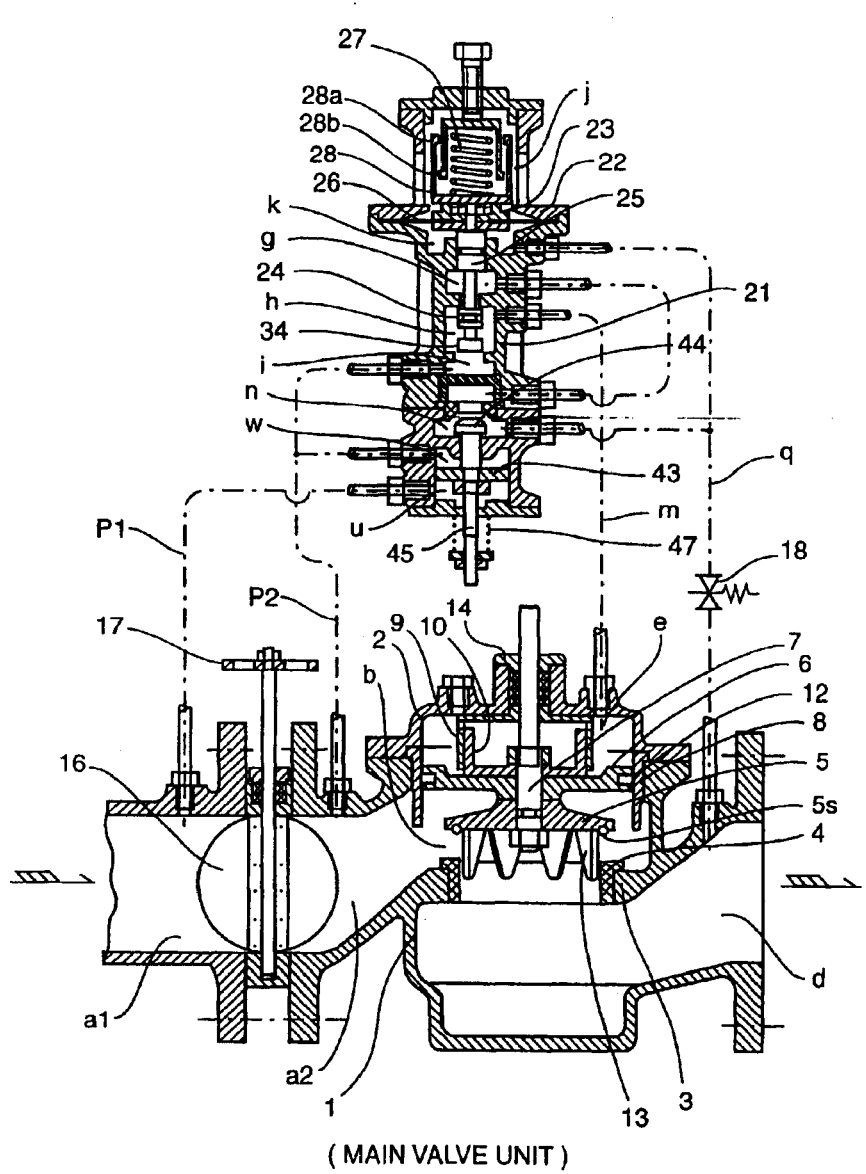
Figure 7:
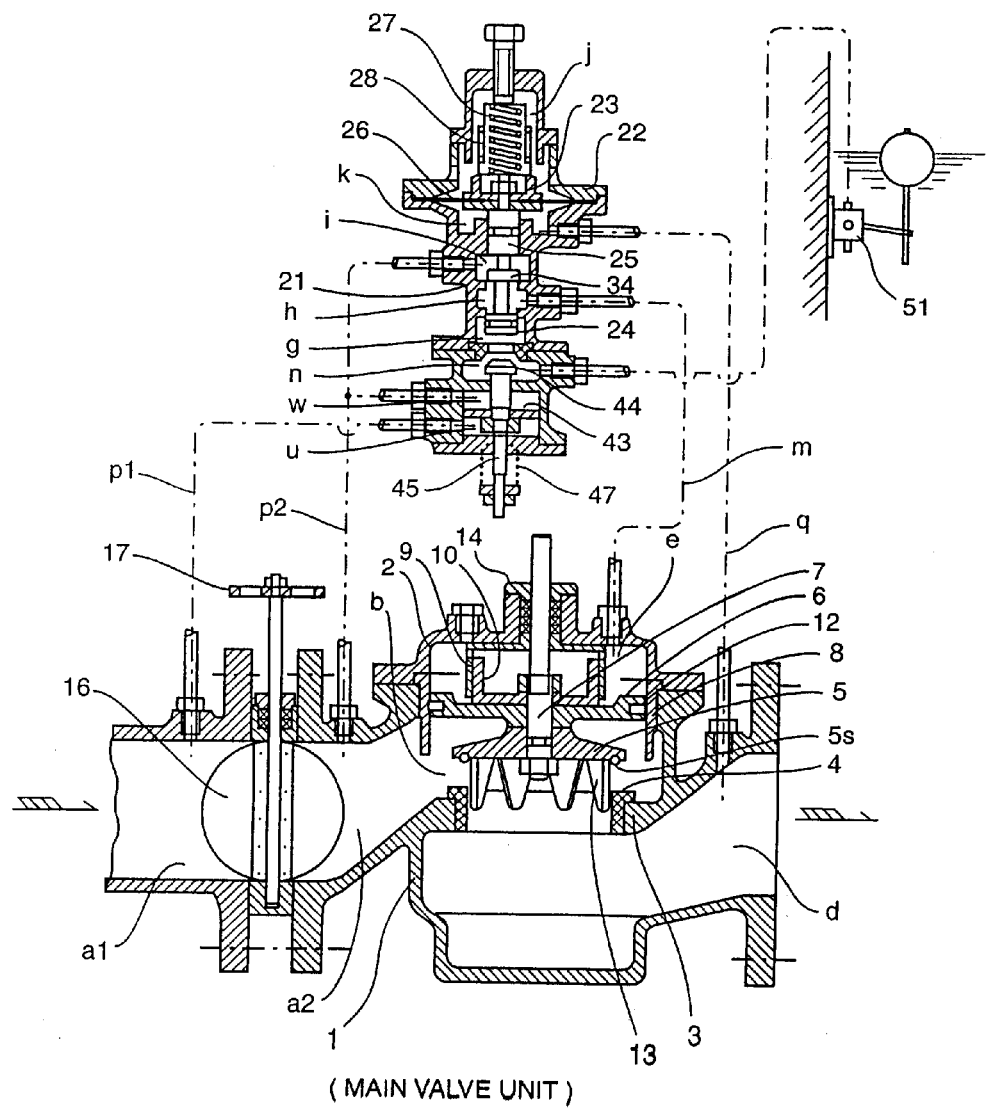
Figure 8:
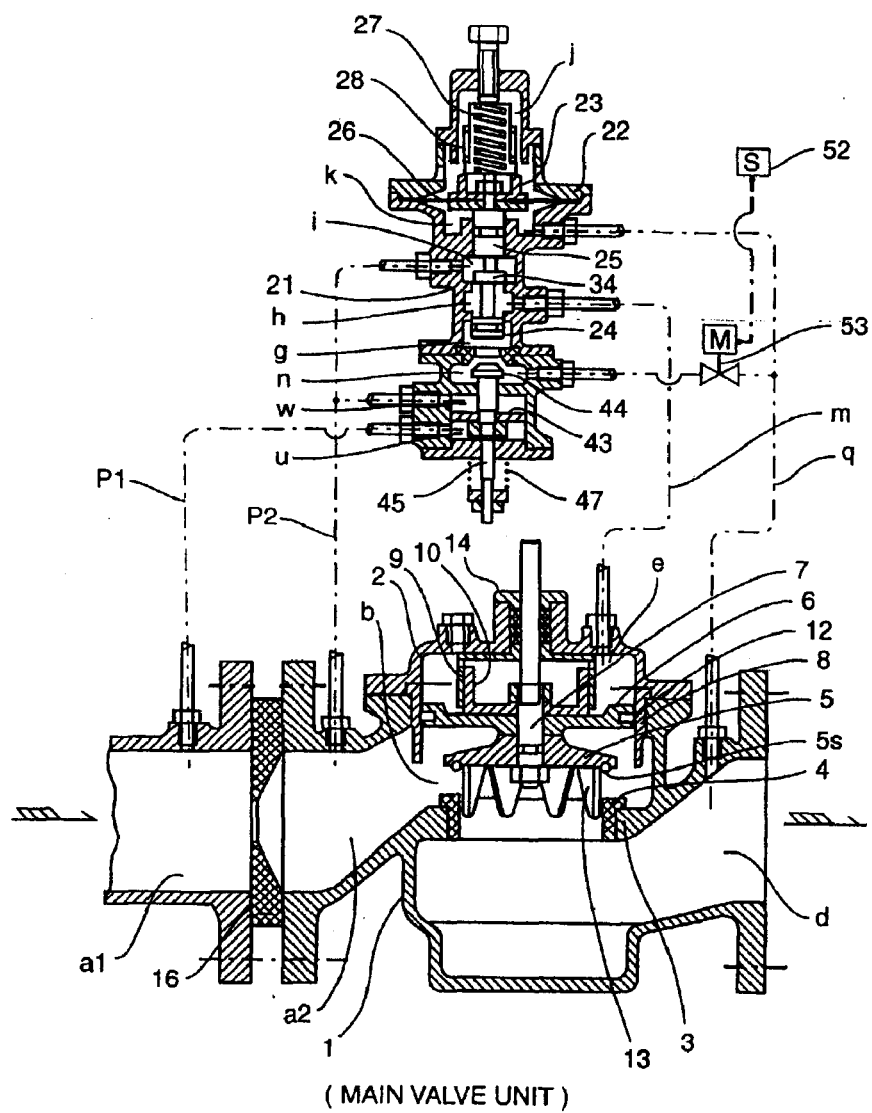
Figure 9:
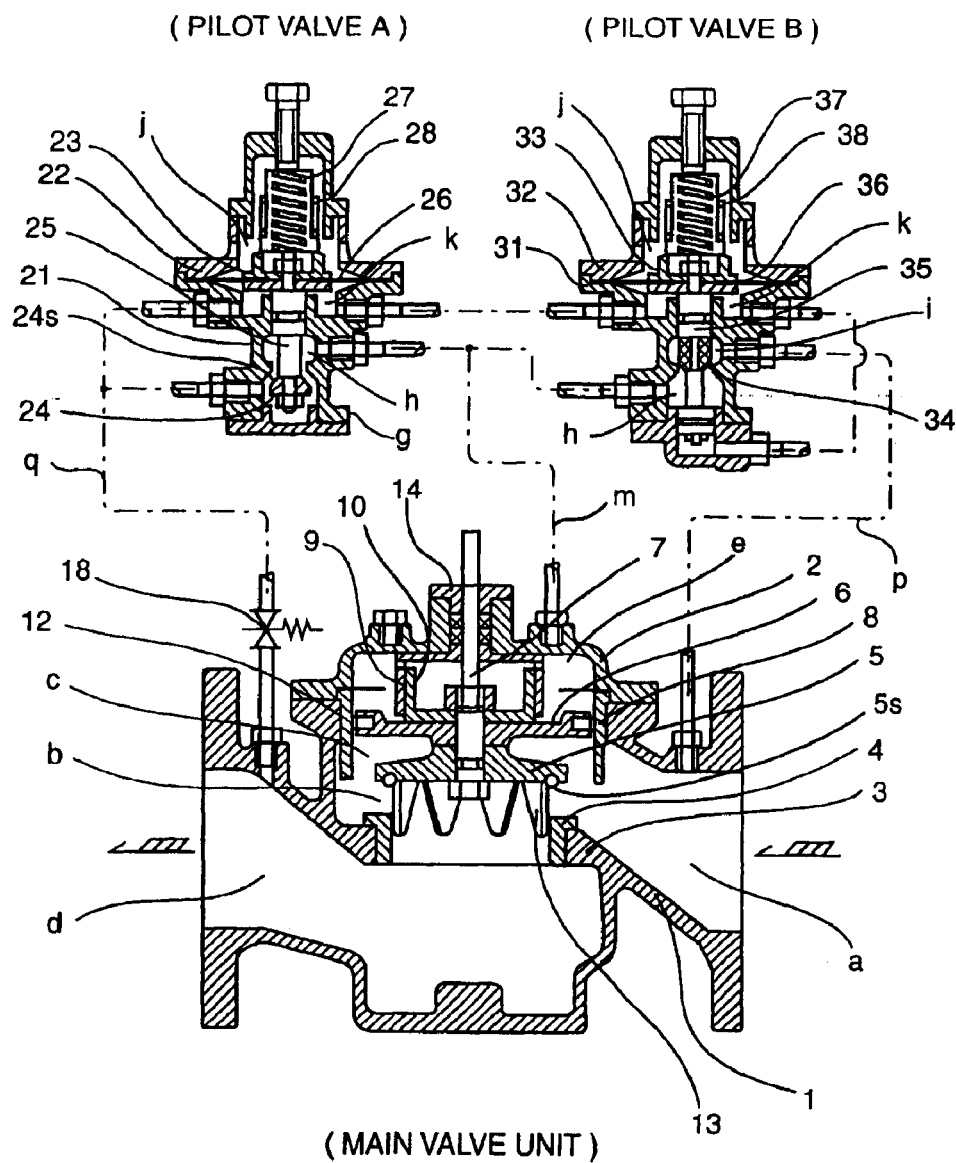
Figure 10:
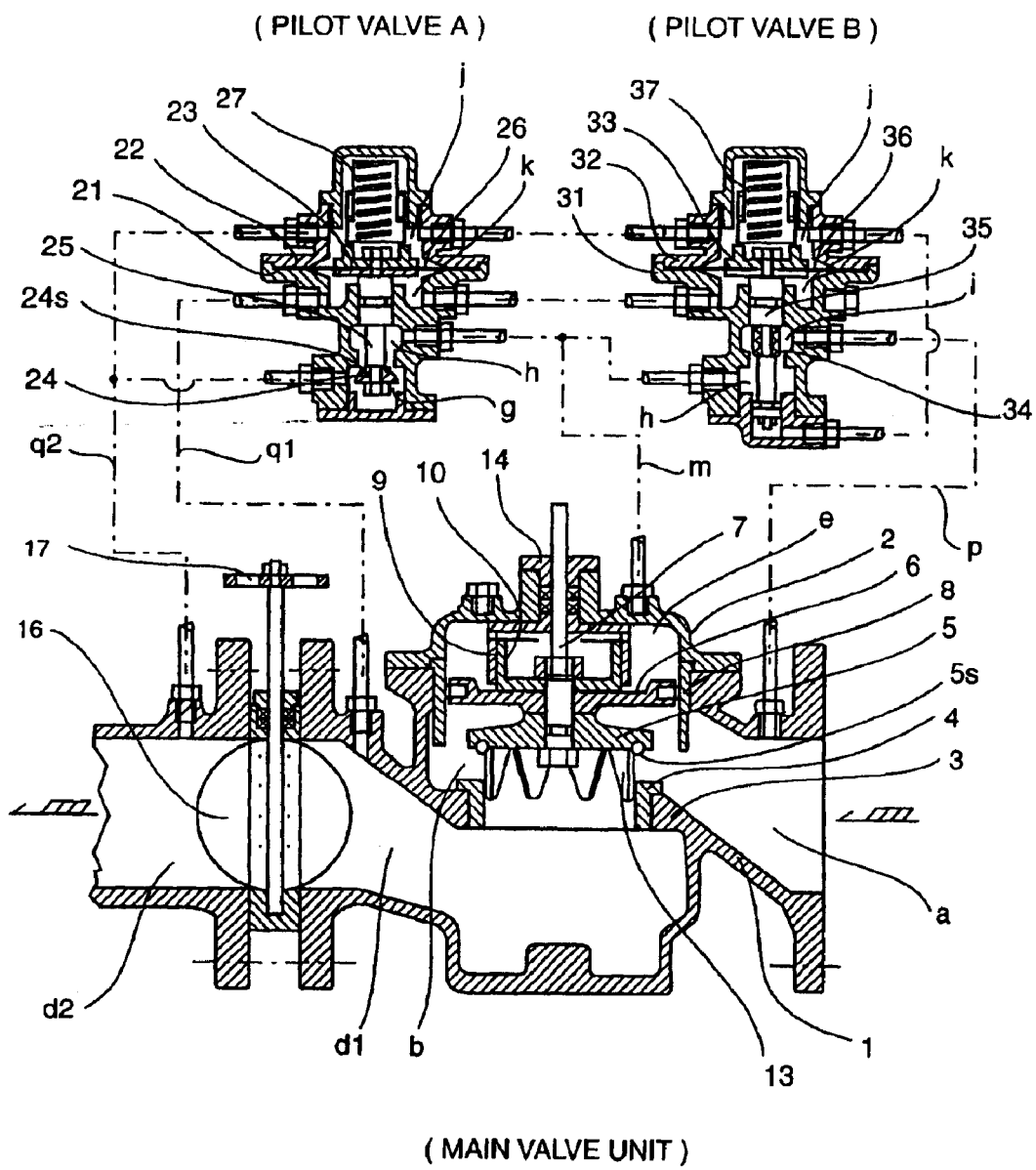

As shown in FIG. 8 an automatic-control valve device in the eighth embodiment is provided with a replaceable fixed orifice 16 instead of the orifice 16 employed in the fourth embodiment. A fixed flow rate is set by adjusting a spring 47.

In the eighth embodiment, a C valve is connected to an outlet passage d of the secondary pressure on the downstream side of a main valve unit through a valve means 53 capable of being closed upon the occurrence of an abnormal condition by an abnormal condition detecting means 52 capable of detecting abnormal conditions which occur in the environment instead of directly connecting the same to the outlet passage d of the main valve unit. Thus, the automatic-control valve device is provided with an additional function as an emergency shutoff valve which closes the associated pipeline automatically in an emergency, such as in case of a fire, an earthquake or abnormal increase of the pressure in the pipeline. The valve means 53 controls the main valve unit to shut off in a similar manner as is done by the float valve 51 in the seventh embodiment. The valve means 53 and the abnormal condition detecting means 52 may be linked by a well-known linking system, such as an electric system which drives the valve means 53 by electric signals generated by sensors or a mechanical system mechanically interlocking the valve means 53 and the abnormal condition detecting means 52, and hence the description thereof will be omitted. The eighth embodiment is similar in other respects, functions and effect to the fourth embodiment.

Technical features common to the foregoing embodiments will be described below.

In any one of the embodiments shown in FIGS. 2 to 8, both the A valve element 24 and the B valve element 34 are mounted on the single stem 25 in an axial arrangement to combine the primary pressure and the secondary pressure in the compound valve by simultaneously moving the A valve element 24 and the B valve element 34 and to deal quickly with the variation of the flowing condition of the fluid by applying a combined pressure produced by combining the primary pressure and the secondary pressure to the main valve driving pressure chamber e. Thus, the automatic-control valve devices in the foregoing embodiments are formed in reasonable, economically effective constructions, respectively. The automatic-control valve devices in these embodiments, similarly to the automatic-control valve device in the first embodiment shown in FIG. 1, employs the cylinder-piston valve operating mechanism to prevent the A valve element 24 and the B valve element 34 from obstructing each other. The A valve element 24 and the B valve element 34 are arranged at positions and at an interval to enable the A valve element 24 and the B valve element 34 to create both a condition where one of the A valve element 24 and the B valve element 34 is at a valve opening position and the other is at a valve closing position, and a condition where both the A valve element 24 and the B valve element 34 are substantially at a valve closing position. Both the A valve element 24 and the B valve element 34 are substantially at the valve closing position while the secondary pressure is stable. Accordingly, the chattering and the hunting, i.e., vibrations, of the A valve element 24 and the B valve element 34 can be avoided.

In the automatic-control valve device shown in FIG. 6, both the A valve element 24 and the B valve element 34 are contained in the intermediate chamber h. The relative positions of the chambers g, h, i, j, k, n, u and w, the combination of the same, and the arrangement of the passages may be changed within the scope of the present invention and the present invention is not limited in its practical application to the foregoing embodiments.

FIG. 1 shows, by way of example, a pressure balancing device 39 for equalizing slightly different pressures acting on the pilot pressure receiving plate 33.

The embodiments shown in FIGS. 1 to 8 employ the springs 27, 37 and 47 as the predetermined pressure means for the pilot valve. Indicated at 28, 38 and 48 are telescopic double-cylinder cases each for containing the spring. FIG. 6 illustrates the construction of the telescopic double-cylinder case in detail. The spring 27 is contained in the telescopic double-cylinder case 28 consisting of the upper cylinder and a lower cylinder. In the state shown in FIG. 6, the stopper formed on the outer circumference of a lower end part of the upper cylinder and the stopper formed on the inner circumference of an upper end part of the lower cylinder are at positions immediately before positions where the same are engaged to limit the extension of the telescopic double-cylinder case 2, and the resilience of the spring 27 is exerted on the pressure receiving plate 23. Since the extension of the telescopic double-cylinder case is limited, the spring can be compressed in the telescopic double-cylinder case so that sufficient energy is stored by the spring. The telescopic double-cylinder case can be easily carried around as a module to be incorporated into the valve for assembling the valve and for the maintenance of the valve. Since the spring can be sufficiently compressed in the telescopic double-cylinder case and can be used in a range of length variation in which the resilience of the same varies in a narrow range, the valve is able to operate accurately. Needless to say, the case may be omitted and only the spring may be used if the valve is used under not very severe working conditions.

The predetermined pressure means may use, instead of an elastic member, such as the spring employed in the foregoing embodiments, for example, a weight which exerts a constant force, may be provided with an assisting servo-mechanism and may be a pneumatic or hydraulic mechanism. The sealing members 26, 36 and 46 combined with the pressure receiving plates 23, 33 and 43 for securing a watertight joint may be diaphragms as those employed in the foregoing embodiments, bellows, or O rings put on the sliding surfaces of the pressure receiving members.

Each of the main valve units employed in the foregoing embodiments is a lift valve provided with the axially movable main valve element 5. A valve other than the lift valve, such as a butterfly valve, a gate valve or a ball valve, may be used. Naturally, the main valve element 5 may be formed integrally with the main valve driving member 6. Although it is desirable, in view of stabilizing the operation of the main valve element 5 in an initial period of passing the fluid through the automatic-control valve device, to provide the automatic-control valve device with a main valve spring 11 as illustrated in FIG. 5, the main valve spring 11 may be omitted because the main valve spring 11 does not have any particular effect on the operation of the main valve element 5 after the elapse of the initial period. The main passage a.b.d in the main valve unit, and the main valve driving pressure chamber e are formed in a compact arrangement in the main valve casing 1 in each of the automatic-control valve devices in the foregoing embodiments to simplify the construction of the main valve unit. The main passage and the main valve driving pressure chamber e may be formed in two separate main valve casings, respectively, and the main valve element 5 and the main valve driving member 6 may be fixedly held on the opposite end parts of a main valve stem extending through the two main valve casing.

The valve elements of the main valve unit and the pilot valve unit are required to operates gradually under some conditions of use. In the automatic-control valve devices illustrated in FIGS. 1 to 8, the main valve opening b is formed in a sawtooth passage to make the flow rate vary smoothly, and the main valve unit is provided with a damping mechanism comprising a damping cylinder 9 and a piston 10 to prevent the effects of pressure pulsation resulting from sudden change of flow, such as chattering of the valve element. Needless to say, the secondary pressure passage connected to the secondary pressure chamber k may be provided with a restrictor, not shown, and the pilot valves may be provided with a damping mechanism for the foregoing purpose. Those methods of preventing the effects of pressure pulsation may be individually employed, may be employed in combination, or may be omitted if the automatic-control valve device is used under conditions not requiring such methods.

The orifice 16 may be a generally known valve, such as a butterfly valve, a gate valve, a ball valve or a lift valve. Since the orifice 16 need not necessarily be able to shut the passage in a watertight fashion, the valve seat of the orifice 16 need not necessarily be provided with a sealing member. The orifice 16 may be operated by operating the handwheel 17 by hand or may be operated by an actuator. Needless to say, the orifice may be operated by an automatic driving procedure.

The orifice 16 is disposed on the downstream side of the main valve unit in the automatic-control valve devices shown in FIGS. 1 to 3, and the orifice 16 is disposed on the upstream side of the main valve unit in the automatic-control valve devices shown in FIGS. 4 to 8. Basically, the orifice may be disposed either the upstream side or the downstream side of the main valve unit. It is desirable to dispose the orifice 16 on the downstream side of the main valve unit in view of the capability of easily reducing a design pressure to be applied to the C valve. It is desirable to dispose the orifice 16 on the upstream side of the main valve unit with the aim to reducing the effect of pressure pulsation resulting from the operation of the main valve element 5 on the C valve.

When the predetermined pressure means (spring 47) of the C valve is provided with the adjusting mechanism as shown in FIGS. 3 to 8, a means for adjusting the flow rate of the fluid is not limited to the adjustment of the orifice 16 because the adjustment of the predetermined pressure is equivalent to the setting of a flow rate. A flow rate may be set only through the operation of the adjusting mechanism for adjusting the predetermined pressure means of the C valve and a fixed orifice as illustrated in FIG. 8 may be employed as the orifice 16. The use of a fixed orifice is effective particularly when it is desired to reduce measuring errors in the measurement of the pressure difference across the orifice attributable to turbulent flows to the least possible extend. Subjecting the pressure difference across the orifice to turbulent flows can be avoided by forming grooves in parts of the fixed orifice around the front and the back pressure measuring opening, which is a well-known method and hence the description thereof will be omitted.

The sealing members put on the components of the main valve unit and the pilot valve unit to secure a watertight joint may be O-rings, oil seals, diaphragms or bellows. If a satisfactory watertight joint can be secured by the direct contact of the mating parts, the sealing member may be omitted. The valve elements of the main valve unit (combination of a main valve and an orifice) and the pilot valve unit or the valve seats for those valve elements may be provided with protrusions similar to the teeth of a comb or a honeycomb to prevent cavitation or the like. A safety valve 18 may be connected to a part of the main valve unit at a proper downstream position on the main valve unit as shown in FIG. 6 of the safety management of the associated facilities.

There is no reason for inhibiting the application of conventional techniques to the component parts of the valves of the present invention. The present invention is not limited in its practical application to the foregoing embodiments specifically described herein, and many changes and variations may be made therein without departing from the scope and spirit of the invention.

INDUSTRIAL APPLICABILITY

The automatic-control valve device according to the present invention is a convenient, maintenance-free valve device having the pilot valve unit not provided with any fixed restricting devices, such as needle valves, free from troubles resulting from the clogging of the valves with sand and/or dust because the valve elements are able to open properly for self cleaning when necessary, capable of securing perfect watertight joints when the automatic-control valve device is closed, provided with the pressure adjusting mechanism capable of operating without causing the abnormal rise of the secondary pressure in both a state where the automatic-control valve device is open and a state where the same is closed, and capable of automatically limiting the flow rate to a predetermined value. A liquid level control function and an emergency shutoff function can be readily incorporated into the automatic-control valve device. The pilot valve unit has a simple construction, the secondary pressure and the flow rate can be set by simple setting operations. The automatic-control valve device has neither component parts nor devices that will impose difficulties on designing, manufacturing, operating and maintaining the same. Thus, the automatic-control valve device of the present invention is highly reliable and highly economically effective.

What is claimed is:

1. An automatic-control valve device comprising a main valve unit, and a pilot valve unit interlocked with the main valve unit to control the main valve unit according to variation of pressure of a fluid flowing through the main valve unit;

wherein the main valve unit comprises a main valve casing, a main valve element disposed in the main valve casing, and a main valve driving member disposed in the main valve casing together with the main valve element and having a pressure receiving area greater than that of the main valve element; the main valve element is disposed on an upstream side of a main valve seat so as to form a restricting passage between the main valve element and the main valve seat; the main valve driving member is disposed for sliding movement in a space defined by a cylindrical wall in the main valve casing so as to define a main valve driving pressure chamber together with the cylindrical wall, an orifice is formed in a passage extending through the main valve unit; and the pilot valve unit comprises;

a pilot valve A which is operated by a balance of forces counteracting each other and produced respectively by pressure in a passage on a downstream side of the main valve unit and a first predetermined pressure means, closes when pressure in the passage on the downstream side of the main valve unit increases beyond a predetermined level and opens when the same decreases below the predetermined level, a pilot valve B which is operated by a balance of forces counteracting each other and produced respectively by pressure in the passage on the downstream side of the main valve unit and a second predetermined pressure means, opens when pressure in the passage on the downstream side of the main valve unit increases beyond a predetermined level and closes when the same decreases below the predetermined level, and a pilot valve C which is operated by a balance of forces counteracting each other and produced respectively by pressure difference across the orifice and a third predetermined pressure means, closes when pressure difference across the orifice is greater than a predetermined value and opens when the same pressure difference is smaller than the predetermined value; and the pilot valve A and the pilot valve B are connected in series via passages through the main valve driving pressure chamber in a section between a passage on the upstream side of the main valve unit and a passage on the downstream side of the main valve unit, and the pilot valve C is connected in series to passages connected to the pilot valve A.

2. The automatic-control valve device according to claim 1, wherein the pilot valve A and the pilot valve B are provided, respectively, with valve elements held on a single valve stem to operate both the valve elements simultaneously by the balance of forces counteracting each other and produced respectively by pressure in the passage on the downstream side of the main valve unit and the predetermined pressure means.

3. The automatic-control valve device according to claim 1, wherein the orifice is of a variable type.

4. The automatic-control valve device according to claim 1, further comprising a valve means placed in a passage extending across the pilot valve A to open and close the passage.

5. The automatic-control valve device according to claim 4, wherein said valve means opens and closes according to variation of a liquid level on the down stream side.

6. The automatic-control valve device according to claim 4, wherein said valve means is closed upon detection of an abnormal condition by an abnormal condition detecting means.

7. The automatic-control valve device according to claim 1, wherein the predetermined pressure means comprises an extensible double-cylinder case having an upper cylinder and a lower cylinder, capable of extending to a limit length limited by the engagement of the upper and the lower cylinder, and a compressed elastic member contained in the double-cylinder case.

8. The automatic control value device according to claim 1 wherein the first and second predetermined pressure means are provided by a common device.

9. The automatic control value device according to claim 8 wherein the common device is a spring.

10. An automatic-control valve device comprising a main valve unit, and a pilot valve unit interlocked with the main valve unit to control the main valve unit according to variation of pressure of a fluid flowing through the main valve unit;

wherein the main valve unit comprises a main valve casing, a main valve element disposed in the main valve casing, and a main valve driving member disposed in the main valve casing together with the main valve element and having a pressure receiving area greater than that of the main valve element; the main valve element is disposed on an upstream side of a main valve seat so as to form a restricting passage between the main valve element and the main valve seat; the main valve driving member is disposed for sliding movement in a space defined by a cylindrical wall in the main valve casing so as to define a main valve driving pressure chamber together with the cylindrical wall, an orifice is formed in a passage extending through the main valve unit; and the pilot valve unit comprises;

a first pilot valve which is operated by a balance of forces counteracting each other and produced respectively by pressure in a passage on a downstream side of the main valve unit and a first predetermined pressure, said first pilot valve closing when pressure in the passage on the downstream side of the main valve unit increases beyond a predetermined level and opening when the same decreases below the first mentioned predetermined level, a second pilot valve which is operated by a balance of forces counteracting each other and produced respectively by pressure in the passage on the downstream side of the main valve unit and a second predetermined pressure, said second pilot valve opening when pressure in the passage on the downstream side of the main valve unit increases beyond a predetermined level and closes when the same decreases below the second mentioned predetermined level, and a third pilot valve which is operated by a balance of forces counteracting each other and produced respectively by pressure difference across the orifice and a third predetermined pressure, said third pilot valve closing when pressure difference across the orifice is greater than a predetermined value and opening when the same pressure difference is smaller than the predetermined value; and the first pilot valve and the second pilot valve are connected in series via passages through the main valve driving pressure chamber in a section between a passage on the upstream side of the main valve unit and a passage on the downstream side of the main valve unit, and the third pilot valve is connected in series to passages connected to the first pilot valve.

11. The automatic control valve device according to claim 10 wherein the first and second predetermined pressure are provided by a common device and wherein the first and second mentioned predetermined pressures are a common pressure.

12. The automatic control valve device according to claim 11 wherein the common device is a spring.

13. An automatic-control valve device comprising a main valve unit, and a pilot valve unit interlocked with the main valve unit to control the main valve unit according to variation of pressure of a fluid flowing through the main valve unit;

wherein the main valve unit comprises a main valve casing, a main valve element disposed in the main valve casing, and a main valve driving member disposed in the main valve casing together with the main valve element and having a pressure receiving area greater than that of the main valve element; the main valve element is disposed on an upstream side of a main valve seat so as to form a restricting passage between the main valve element and the main valve seat; the main valve driving member is disposed for sliding movement in a space defined by a cylindrical wall in the main valve casing so as to define a main valve driving pressure chamber together with the cylindrical wall, an orifice is formed in a passage extending through the main valve unit; and the pilot valve unit comprises;
- a first pilot valve which is operated by a balance of forces counteracting each other and produced respectively by pressure in a passage on a downstream side of the main valve unit and a predetermined pressure, said first pilot valve closing when pressure in the passage on the downstream side of the main valve unit increases beyond a predetermined level and opening when the same decreases below the first mentioned predetermined level,
- a second pilot valve which is operated by a balance of forces counteracting each other and produced respectively by pressure in the passage on the downstream side of the main valve unit and said predetermined pressure, said second pilot valve opening when pressure in the passage on the downstream side of the main valve unit increases beyond the predetermined level and closes when the same decreases below the second mentioned predetermined level, and
- a third pilot valve which is operated by a balance of forces counteracting each other and produced respectively by pressure difference across the orifice and a predetermined pressure source, said third pilot valve closing when pressure difference across the orifice is greater than a predetermined value and opening when the same pressure difference is smaller than the predetermined value; and
- the first pilot valve and the second pilot valve are connected in series via passages through the main valve driving pressure chamber in a section between a passage on the upstream side of the main valve unit and a passage on the downstream side of the main valve unit, and the third pilot valve is connected in series to passages connected to the first pilot valve.

* * * * *

UNITED STATES PATENT AND TRADEMARK OFFICE
CERTIFICATE OF CORRECTION

PATENT NO.   : 6,135,142
DATED        : October 24, 2000
INVENTOR(S)  : Hiroshi Yokota et al.

It is certified that error appears in the above-identified patent and that said Letters Patent is hereby corrected as shown below:

The title page, should be deleted to be replaced with the attached title page.

Please replace sheets 1-10 and substitute therefore drawings sheets 1-10 as shown on attached pages.

Signed and Sealed this

Thirteenth Day of May, 2003

JAMES E. ROGAN
*Director of the United States Patent and Trademark Office*

United States Patent [19]
Yokota et al.

[11] Patent Number: 6,135,142
[45] Date of Patent: Oct. 24, 2000

[54] CONTROL VALVE DEVICE

[75] Inventors: Hiroshi Yokota; Shingo Yokota, both of Hiroshima, Japan

[73] Assignee: Kabushiki Kaisha Yokota Seisakusho, Hiroshima-Ken, Japan

[21] Appl. No.: 09/194,324

[22] PCT Filed: Jan. 6, 1997

[86] PCT No.: PCT/JP97/00042

§ 371 Date: Nov. 24, 1998

§ 102(e) Date: Nov. 24, 1998

[87] PCT Pub. No.: WO97/45665

PCT Pub. Date: Dec. 4, 1997

[30]  Foreign Application Priority Data

May 29, 1996 [JP] Japan .................................. 8-135376

[51] Int. Cl.$^7$ ..................................................... G05D 7/00
[52] U.S. Cl. ............................................ 137/486; 137/492
[58] Field of Search ...................................... 137/486, 492

[56] References Cited

U.S. PATENT DOCUMENTS 5,735,308  4/1998  Yokota et al. .

FOREIGN PATENT DOCUMENTS

| 49-57414 | 6/1974 | Japan . |
| 60-53291 | 3/1985 | Japan . |
| B-8-6837 | 4/1992 | Japan . |

*Primary Examiner*—Gerald A. Michalsky
*Attorney, Agent, or Firm*—Ladas & Parry

[57] ABSTRACT

An automatic-control valve device has a main valve unit, and a pilot valve unit for controlling the main valve unit. The pilot valve unit has a pilot valve A which closes when pressure in a downstream passage on the downstream side of the main valve unit increases beyond a predetermined value, a pilot valve B which opens when pressure in the downstream passage increases beyond the predetermined value. The pilot valve A and the pilot valve B are connected in series by passages through a main valve driving pressure chamber in a section between an upstream passage on the upstream side of the main valve unit and the downstream passage, and cooperate to maintain the pressure in the downstream passage at the predetermined valve. A pilot valve C which closes when the pressure difference across an orifice disposed in a passage extending through the main valve unit is greater than a predetermined value is connected in series to a passage extending across the pilot valve A to limit the flow rate of a fluid in the downstream passage to a predetermined value. The respective valve elements of the pilot valve A and the pilot valve B may be held on a single valve stem. The orifice may be of a variable type. The automatic-control valve device may be provided with a valve means placed in a passage extending across the pilot valve A to open and close the passage according to the variation of a liquid level on the downstream side, and a valve means placed in a passage extending across the pilot valve A to close the passage upon the detection of an abnormal condition by an abnormal condition detecting means.

13 Claims, 10 Drawing Sheets

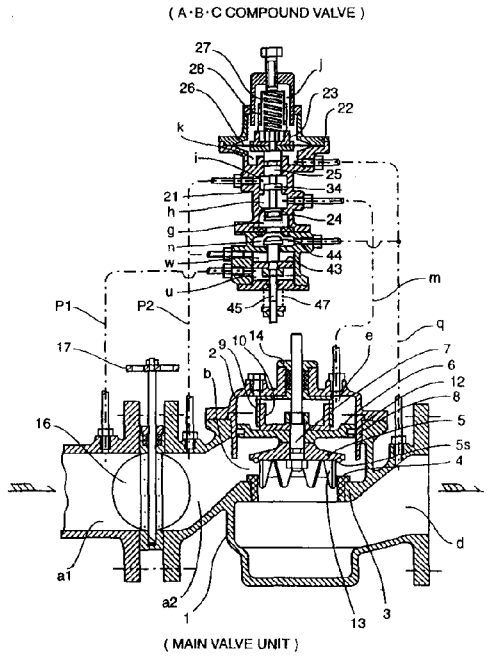

( A·B·C COMPOUND VALVE )

( MAIN VALVE UNIT )

UNITED STATES PATENT AND TRADEMARK OFFICE
CERTIFICATE OF CORRECTION

PATENT NO. : 6,135,142
DATED : November 24, 1998
INVENTOR(S) : Hiroshi Yokota et al.

It is certified that error appears in the above-identified patent and that said Letters Patent is hereby corrected as shown below:

<u>Title page,</u>
Item [73], Assignee, change "Kabushiki Kaisha Yokota Seisakusho" to
-- Kabushiki Kaisha Yokota Seisakusho, Hiroshi Yokota and Shingo Yokota --

Signed and Sealed this

Twenty-seventh Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,135,142
DATED : October 24, 2000
INVENTOR(S) : Hiroshi Yokota et al.

It is certified that error appears in the above-identified patent and that said Letters Patent is hereby corrected as shown below:

The title page, should be deleted to be replaced with the attached title page.

Please replace sheets 1-10 and substitute therefore drawings sheets 1-10 as shown on attached pages.

This certificate supersedes Certificate of Correction issued May 13, 2003.

Signed and Sealed this

Twentieth Day of September, 2005

JON W. DUDAS
*Director of the United States Patent and Trademark Office*

United States Patent [19]
Yokota et al.

[11] Patent Number: 6,135,142
[45] Date of Patent: Oct. 24, 2000

[54] CONTROL VALVE DEVICE

[75] Inventors: Hiroshi Yokota; Shingo Yokota, both of Hiroshima, Japan

[73] Assignee: Kabushiki Kaisha Yokota Seisakusho, Hiroshima-Ken, Japan

[21] Appl. No.: 09/194,324
[22] PCT Filed: Jan. 6, 1997
[86] PCT No.: PCT/JP97/00042
§ 371 Date: Nov. 24, 1998
§ 102(e) Date: Nov. 24, 1998
[87] PCT Pub. No.: WO97/45665
PCT Pub. Date: Dec. 4, 1997

[30] Foreign Application Priority Data

May 29, 1996 [JP] Japan ................... 8-135376

[51] Int. Cl.$^7$ ................................................ G05D 7/00
[52] U.S. Cl. ................................... 137/486; 137/492
[58] Field of Search ............................. 137/486, 492

[56] References Cited

U.S. PATENT DOCUMENTS 5,735,308  4/1998  Yokota et al. .

FOREIGN PATENT DOCUMENTS 49-57414   6/1974   Japan .
60-53291   3/1985   Japan .
B-8-6837   4/1992   Japan .

Primary Examiner—Gerald A. Michalsky
Attorney, Agent, or Firm—Ladas & Parry

[57] ABSTRACT

An automatic-control valve device has a main valve unit, and a pilot valve unit for controlling the main valve unit. The pilot valve unit has a pilot valve A which closes when pressure in a downstream passage on the downstream side of the main valve unit increases beyond a predetermined value, a pilot valve B which opens when pressure in the downstream passage increases beyond the predetermined value. The pilot valve A and the pilot valve B are connected in series by passages through a main valve driving pressure chamber in a section between an upstream passage on the upstream side of the main valve unit and the downstream passage, and cooperate to maintain the pressure in the downstream passage at the predetermined valve. A pilot valve C which closes when the pressure difference across an orifice disposed in a passage extending through the main valve unit is greater than a predetermined value is connected in series to a passage extending across the pilot valve A to limit the flow rate of a fluid in the downstream passage to a predetermined value. The respective valve elements of the pilot valve A and the pilot valve B may be held on a single valve stem. The orifice may be of a variable type. The automatic-control valve device may be provided with a valve means placed in a passage extending across the pilot valve A to open and close the passage according to the variation of a liquid level on the downstream side, and a valve means placed in a passage extending across the pilot valve A to close the passage upon the detection of an abnormal condition by an abnormal condition detecting means.

13 Claims, 10 Drawing Sheets

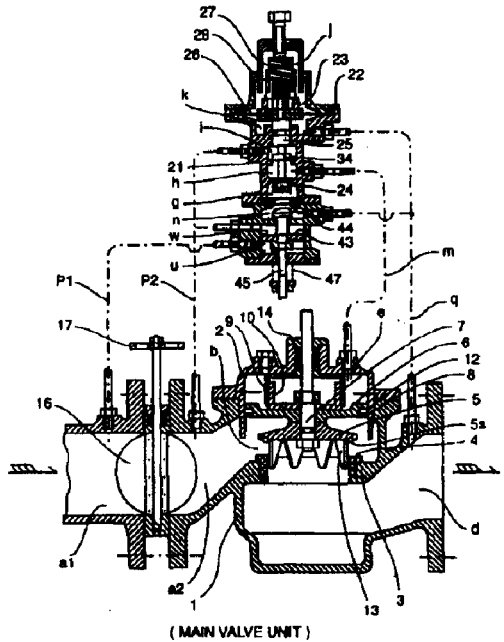

(A·B·C COMPOUND VALVE)
(MAIN VALVE UNIT)